(12) United States Patent
Bisaiji et al.

(10) Patent No.: US 9,032,711 B2
(45) Date of Patent: May 19, 2015

(54) EXHAUST PURIFICATION SYSTEM OF INTERNAL COMBUSTION ENGINE

(75) Inventors: Yuki Bisaiji, Mishima (JP); Kohei Yoshida, Gotemba (JP); Mikio Inoue, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/255,710

(22) PCT Filed: Apr. 1, 2010

(86) PCT No.: PCT/JP2010/056345
§ 371 (c)(1),
(2), (4) Date: Oct. 12, 2011

(87) PCT Pub. No.: WO2011/125198
PCT Pub. Date: Oct. 13, 2011

(65) Prior Publication Data
US 2013/0011302 A1    Jan. 10, 2013

(51) Int. Cl.
*F01N 3/00*    (2006.01)
*B01D 53/94*    (2006.01)
(Continued)

(52) U.S. Cl.
CPC ...... *B01D 53/9422* (2013.01); *B01D 2251/208* (2013.01); *B01D 2255/1021* (2013.01); *B01D 2255/1023* (2013.01); *B01D 2255/1025* (2013.01); *B01D 2255/1028* (2013.01); *B01D 2255/104* (2013.01); *B01D 2255/2022* (2013.01); *B01D 2255/2027* (2013.01); *B01D 2255/2042* (2013.01);
(Continued)

(58) Field of Classification Search
USPC .......... 60/286, 295, 297, 299, 285, 301, 300, 60/303, 277; 477/100
See application file for complete search history.

(56) References Cited

U.S. PATENT DOCUMENTS 5,052,178 A * 10/1991 Clerc et al. ............... 60/274
5,057,483 A    10/1991 Wan
(Continued)

FOREIGN PATENT DOCUMENTS

CN    101454081 A    6/2009
CN    101600860 A    12/2009
(Continued)

OTHER PUBLICATIONS

International Search Report issued in International Patent Application No. PCT/JP2010/056345 dated Jun. 29, 2010.
(Continued)

*Primary Examiner* — Thomas Denion
*Assistant Examiner* — Kelsey Stanek
(74) *Attorney, Agent, or Firm* — Oliff PLC

(57) ABSTRACT

In an internal combustion engine, inside of an engine exhaust passage, a hydrocarbon feed valve and an exhaust purification catalyst are arranged. On the exhaust purification catalyst, platinum Pt is carried and a basic layer is formed. The concentration of hydrocarbons which flows into the exhaust purification catalyst is made to vibrate by within a predetermined range of amplitude and a predetermined range of period due to which the $NO_x$ which is contained in exhaust gas is reduced at the exhaust purification catalyst. At this time, the greater the oxidizing strength of the exhaust purification catalyst, the greater the injection pressure of hydrocarbons from the hydrocarbon feed valve.

11 Claims, 14 Drawing Sheets

(51) Int. Cl.
*F01N 3/035* (2006.01)
*F01N 3/20* (2006.01)
*F01N 13/00* (2010.01)

(52) U.S. Cl.
CPC ............ B01D 2255/2045 (2013.01); B01D 2255/20738 (2013.01); B01D 2255/20761 (2013.01); *F01N 3/035* (2013.01); *F01N 3/206* (2013.01); *F01N 3/208* (2013.01); F01N 2610/03 (2013.01); F01N 2610/144 (2013.01); Y02T 10/24 (2013.01); *F01N 13/009* (2014.06)

(56) References Cited

U.S. PATENT DOCUMENTS

| | | |
|---|---|---|
| 5,075,274 A | 12/1991 | Kiyohide et al. |
| 5,402,641 A | 4/1995 | Katoh et al. |
| 5,882,607 A | 3/1999 | Miyadera et al. |
| 6,109,024 A | 8/2000 | Kinugasa et al. |
| 6,327,851 B1 | 12/2001 | Bouchez et al. |
| 6,413,483 B1 | 7/2002 | Brisley et al. |
| 6,477,834 B1 | 11/2002 | Asanuma et al. |
| 6,667,018 B2 | 12/2003 | Noda et al. |
| 6,813,882 B2 | 11/2004 | Hepburn et al. |
| 6,854,264 B2 | 2/2005 | Elwart et al. |
| 6,877,311 B2 | 4/2005 | Uchida |
| 6,983,589 B2 | 1/2006 | Lewis et al. |
| 7,063,642 B1* | 6/2006 | Hu et al. ............ 477/100 |
| 7,073,325 B2 | 7/2006 | Nakatani et al. |
| 7,082,753 B2 | 8/2006 | Dalla Betta et al. |
| 7,111,456 B2 | 9/2006 | Yoshida et al. |
| 7,137,379 B2* | 11/2006 | Sasaki et al. ........... 123/299 |
| 7,146,800 B2 | 12/2006 | Toshioka et al. |
| 7,165,393 B2 | 1/2007 | Betta et al. |
| 7,299,625 B2 | 11/2007 | Uchida et al. |
| 7,332,135 B2 | 2/2008 | Gandhi et al. |
| 7,412,823 B2 | 8/2008 | Reuter et al. |
| 7,454,900 B2 | 11/2008 | Hayashi |
| 7,484,504 B2 | 2/2009 | Kato et al. |
| 7,506,502 B2 | 3/2009 | Nakano et al. |
| 7,549,284 B2 | 6/2009 | Iihoshi et al. |
| 7,703,275 B2* | 4/2010 | Asanuma et al. ......... 60/286 |
| 7,707,821 B1 | 5/2010 | Legare |
| 7,861,516 B2 | 1/2011 | Allansson et al. |
| 8,099,950 B2 | 1/2012 | Kojima et al. |
| 8,215,101 B2 | 7/2012 | Tsujimoto et al. |
| 8,261,532 B2 | 9/2012 | Fukuda et al. |
| 8,281,569 B2 | 10/2012 | Handa et al. |
| 8,434,296 B2 | 5/2013 | Wada et al. |
| 8,572,950 B2 | 11/2013 | Bisaiji et al. |
| 8,656,706 B2 | 2/2014 | Umemoto et al. |
| 8,671,667 B2 | 3/2014 | Bisaiji et al. |
| 8,679,410 B2 | 3/2014 | Umemoto et al. |
| 8,689,543 B2 | 4/2014 | Numata et al. |
| 8,695,325 B2 | 4/2014 | Bisaiji et al. |
| 2001/0052232 A1 | 12/2001 | Hoffmann et al. |
| 2002/0029564 A1 | 3/2002 | Roth et al. |
| 2003/0010020 A1 | 1/2003 | Taga et al. |
| 2003/0040432 A1 | 2/2003 | Beall et al. |
| 2003/0101713 A1 | 6/2003 | Dalla Betta et al. |
| 2004/0045285 A1 | 3/2004 | Penetrante et al. |
| 2004/0050037 A1 | 3/2004 | Betta et al. |
| 2004/0055285 A1 | 3/2004 | Rohr et al. |
| 2004/0154288 A1* | 8/2004 | Okada et al. ............ 60/286 |
| 2004/0175305 A1 | 9/2004 | Nakanishi et al. |
| 2004/0187477 A1 | 9/2004 | Okugawa et al. |
| 2005/0135977 A1 | 6/2005 | Park et al. |
| 2005/0147541 A1 | 7/2005 | Ajisaka et al. |
| 2006/0053778 A1 | 3/2006 | Asanuma et al. |
| 2006/0107657 A1 | 5/2006 | Bernler et al. |
| 2006/0153761 A1 | 7/2006 | Bandl-Konrad et al. |
| 2006/0286012 A1 | 12/2006 | Socha et al. |
| 2007/0016357 A1 | 1/2007 | Nakagawa et al. |
| 2007/0028601 A1 | 2/2007 | Duvinage et al. |
| 2007/0059223 A1 | 3/2007 | Golunski et al. |
| 2007/0089403 A1 | 4/2007 | Pfeifer et al. |
| 2007/0125073 A1 | 6/2007 | Reuter et al. |
| 2007/0151232 A1 | 7/2007 | Dalla Betta et al. |
| 2008/0022662 A1 | 1/2008 | Yan |
| 2008/0053073 A1 | 3/2008 | Kalyanaraman et al. |
| 2008/0102010 A1 | 5/2008 | Bruck et al. |
| 2008/0120963 A1 | 5/2008 | Morita et al. |
| 2008/0148711 A1 | 6/2008 | Takubo |
| 2008/0154476 A1 | 6/2008 | Takubo |
| 2008/0196398 A1* | 8/2008 | Yan ............... 60/299 |
| 2008/0223020 A1 | 9/2008 | Yoshida et al. |
| 2008/0276602 A1 | 11/2008 | McCabe et al. |
| 2009/0000277 A1 | 1/2009 | Yoshida et al. |
| 2009/0049824 A1 | 2/2009 | Kojima et al. |
| 2009/0049825 A1 | 2/2009 | Ohashi |
| 2009/0049826 A1 | 2/2009 | Toshioka et al. |
| 2009/0077948 A1 | 3/2009 | Mondori et al. |
| 2009/0084091 A1 | 4/2009 | Tsujimoto et al. |
| 2009/0118121 A1 | 5/2009 | Sarai |
| 2009/0120072 A1 | 5/2009 | Dalla Betta et al. |
| 2009/0151332 A1 | 6/2009 | Toshioka et al. |
| 2009/0191108 A1 | 7/2009 | Blanchard et al. |
| 2009/0196811 A1 | 8/2009 | Yamashita et al. |
| 2009/0229251 A1 | 9/2009 | Kadowaki |
| 2009/0249768 A1 | 10/2009 | Asanuma et al. |
| 2009/0266057 A1 | 10/2009 | Tsujimoto et al. |
| 2009/0282809 A1* | 11/2009 | Toshioka ............... 60/285 |
| 2009/0288393 A1 | 11/2009 | Matsuno et al. |
| 2009/0313970 A1 | 12/2009 | Iida |
| 2010/0005873 A1 | 1/2010 | Katoh et al. |
| 2010/0055012 A1 | 3/2010 | Grisstede et al. |
| 2010/0107613 A1 | 5/2010 | Masuda et al. |
| 2010/0115923 A1 | 5/2010 | Tsujimoto et al. |
| 2010/0126148 A1 | 5/2010 | Morishima et al. |
| 2010/0132356 A1 | 6/2010 | Lee |
| 2010/0154387 A1 | 6/2010 | Shibata et al. |
| 2010/0233051 A1 | 9/2010 | Grisstede et al. |
| 2010/0236224 A1 | 9/2010 | Kumar et al. |
| 2010/0242459 A1 | 9/2010 | Tsujimoto et al. |
| 2011/0041486 A1 | 2/2011 | Kato et al. |
| 2011/0047984 A1 | 3/2011 | Lee et al. |
| 2011/0047988 A1 | 3/2011 | Lewis et al. |
| 2011/0113754 A1 | 5/2011 | Kohara et al. |
| 2011/0120100 A1 | 5/2011 | Yin et al. |
| 2011/0131952 A1 | 6/2011 | Onodera et al. |
| 2011/0173950 A1 | 7/2011 | Wan et al. |
| 2011/0209459 A1 | 9/2011 | Hancu et al. |
| 2012/0122660 A1 | 5/2012 | Andersen et al. |
| 2012/0124967 A1 | 5/2012 | Yang et al. |
| 2012/0124971 A1 | 5/2012 | Bisaiji et al. |
| 2012/0131908 A1 | 5/2012 | Bisaiji et al. |
| 2013/0000284 A1 | 1/2013 | Bisaiji et al. |
| 2013/0011302 A1 | 1/2013 | Bisaiji et al. |
| 2013/0022512 A1 | 1/2013 | Bisaiji et al. |

FOREIGN PATENT DOCUMENTS

| | | |
|---|---|---|
| EP | 1 033 479 A2 | 9/2000 |
| EP | 1 273 337 A1 | 1/2003 |
| EP | 1 371 415 A1 | 12/2003 |
| EP | 1 519 015 A2 | 3/2005 |
| EP | 1 710 407 A1 | 10/2006 |
| EP | 1 793 099 A1 | 6/2007 |
| EP | 1 911 506 A1 | 4/2008 |
| EP | 1 936 164 A1 | 6/2008 |
| EP | 1 965 048 A1 | 9/2008 |
| EP | 2 063 078 A1 | 5/2009 |
| EP | 2 149 684 A1 | 2/2010 |
| EP | 2 239 432 | 10/2010 |
| EP | 2 460 989 A1 | 6/2012 |
| JP | A-04-200637 | 7/1992 |
| JP | H-08-117601 | 5/1996 |
| JP | A-09-004437 | 1/1997 |
| JP | A-09-220440 | 8/1997 |
| JP | A-11-30117 | 2/1999 |
| JP | A-11-062559 | 3/1999 |
| JP | A-11-081994 | 3/1999 |
| JP | A-2000-257419 | 9/2000 |
| JP | A-2002-188429 | 7/2002 |

(56) References Cited

FOREIGN PATENT DOCUMENTS

| | | |
|---|---|---|
| JP | A-2004-016850 | 1/2004 |
| JP | A-2004-36543 | 2/2004 |
| JP | A-2004-216224 | 8/2004 |
| JP | A-2004-290965 | 10/2004 |
| JP | A-2004-308526 | 11/2004 |
| JP | A-2004-316458 | 11/2004 |
| JP | A-2005-61340 | 3/2005 |
| JP | A-2005-113801 | 4/2005 |
| JP | A-2005-171853 | 6/2005 |
| JP | A-2005-177738 | 7/2005 |
| JP | A-2006-501390 | 1/2006 |
| JP | A-2006-512529 | 4/2006 |
| JP | A-2006-342700 | 12/2006 |
| JP | A-2007-064167 | 3/2007 |
| JP | A-2007-514090 | 5/2007 |
| JP | A-2007-514104 | 5/2007 |
| JP | A-2007-154794 | 6/2007 |
| JP | B2-3969450 | 9/2007 |
| JP | A-2007-278120 | 10/2007 |
| JP | A-2008-002451 | 1/2008 |
| JP | A-2008-19760 | 1/2008 |
| JP | A-2008-69769 | 3/2008 |
| JP | A-2008-231926 | 10/2008 |
| JP | A-2008-232003 | 10/2008 |
| JP | A-2008-255858 | 10/2008 |
| JP | A-2008-267178 | 11/2008 |
| JP | A-2008-267217 | 11/2008 |
| JP | A-2008-286186 | 11/2008 |
| JP | A-2008-543559 | 12/2008 |
| JP | A-2009-30560 | 2/2009 |
| JP | A-2009-112967 | 5/2009 |
| JP | A-2009-114879 | 5/2009 |
| JP | A-2009-156067 | 7/2009 |
| JP | A-2009-165922 | 7/2009 |
| JP | A-2009-167973 | 7/2009 |
| JP | A-2009-168031 | 7/2009 |
| JP | WO 2009/082035 A1 | 7/2009 |
| JP | A-2009-191823 | 8/2009 |
| JP | A-2009-221939 | 10/2009 |
| JP | A-2009-226349 | 10/2009 |
| JP | A-2009-243362 | 10/2009 |
| JP | A-2009-275631 | 11/2009 |
| JP | A-2009-275666 | 11/2009 |
| JP | A-2010-012459 | 1/2010 |
| JP | A-2010-048134 | 3/2010 |
| JP | A-2011-190803 | 9/2011 |
| JP | B1-4868097 | 2/2012 |
| WO | WO 2005/059324 | 6/2005 |
| WO | WO 2006/131825 | 12/2006 |
| WO | WO 2007/026229 | 3/2007 |
| WO | WO 2007/141638 | 12/2007 |
| WO | WO 2008/007810 | 1/2008 |
| WO | WO 2008/012653 A2 | 1/2008 |
| WO | WO 2009/016822 | 2/2009 |
| WO | WO 2009/056958 | 5/2009 |
| WO | WO 2011/114499 | 9/2011 |
| WO | WO 2011/114501 | 9/2011 |
| WO | WO 2011/118044 | 9/2011 |

OTHER PUBLICATIONS

Jun. 15, 2010 International Search Report issued in International Application No. PCT/JP2010/054731 (with translation).
Jun. 15, 2010 International Search Report issued in PCT/JP2010/054740 (with translation).
Jun. 15, 2010 Written Opinion issued in PCT/JP2010/054740 (with translation).
Jun. 20, 2012 Search Report issued in European Patent Application No. 10845966.0.
Jan. 17, 2013 Office Action issued in U.S. Appl. No. 13/202,733.
U.S. Appl. No. 13/255,774 in the name of Bisaiji et al. filed Sep. 22, 2011.
U.S. Appl. No. 13/202,733 in the name of Bisaiji et al. filed Sep. 30, 2011.
U.S. Appl. No. 13/934,080, filed Jul. 2, 2013, in the name of Bisaiji et al.
Aug. 13, 2013 International Preliminary Report on Patentability issued in International Patent Application No. PCT/JP2011/053429 (with translation).
Aug. 8, 2013 Office Action issued in U.S. Appl. No. 13/258,483.
Feb. 6, 2014 Corrected Notice of Allowability issued in U.S. Appl. No. 13/202,694.
Dec. 21, 2010 International Search Report issued in International Patent Application No. PCT/JP2010/065449.
Dec. 27, 2011 International Search Report issued in International Patent Application No. PCT/JP2011/075618.
Jun. 15, 2010 International Search Report issued in International Patent Application No. PCT/JP2010/054730 (with translation).
Nov. 22, 2010 International Search Report issued in International Patent Application No. PCT/JP2010/065186.
Jan. 18, 2011 International Search Report issued in International Patent Application No. PCT/JP2010/067705.
Jan. 18, 2011 International Search Report issued in International Application No. PCT/JP2010/067707.
Jan. 18, 2011 International Search Report issued in International Patent Application No. PCT/JP2010/068785.
Jul. 14, 2014 Office Action issued in U.S. Appl. No. 13/262,001.
Jul. 14, 2014 Office Action issued in U.S. Appl. No. 13/264,884.
Jun. 16, 2014 Office Action issued in U.S. Appl. No. 13/581,186.
Jun. 18, 2014 Office Action issued in U.S. Appl. No. 13/582,909.
Jun. 19, 2014 Office Action issued in U.S. Appl. No. 13/264,594.
Jun. 21, 2011 International Search Report issued in International Patent Application No. PCT/JP2011/059880.
Jun. 23, 2014 Office Action issued in U.S. Appl. No. 13/262,858.
Jun. 26, 2014 Office Action issued in U.S. Appl. No. 13/580,000.
Jun. 29, 2010 International Search Report issued in International Patent Application No. PCT/JP2010/055303.
Mar. 15, 2011 International Search Report issued in International Patent Application No. PCT/JP2011/053429.
Mar. 22, 2011 International Search Report issued in International Patent Application No. PCT/JP2010/073645.
Mar. 22, 2011 International Search Report issued in International Patent Application No. PCT/JP2010/072299.
Mar. 8, 2011 International Search Report issued in International Patent Application No. PCT/JP2011/052969 (with translation).
May 15, 2013 Office Action in U.S. Appl. No. 13/202,694.
May 17, 2011 International Search Report issued in International Patent Application No. PCT/JP2011/057264.
May 2, 2014 Office Action issued in U.S. Appl. No. 13/263,660.
Mar. 28, 2014 Notice of Allowance issued in U.S. Appl. No. 13/582,862.
Mar. 4, 2014 Notice of Allowance issued in U.S. Appl. No. 13/255,786.
Nov. 13, 2013 Notice of Allowance issued in U.S. Appl. No. 13/202,692.
Oct. 17, 2013 Notice of Allowance issued in U.S. Appl. No. 13/202,694.
Nov. 22, 2010 International Search Report issued in International Patent Application No. PCT/JP2010/065187.
Nov. 26, 2012 Office Action issued in U.S. Appl. No. 13/202,694.
Oct. 26, 2010 International Search Report issued in International Patent Application No. PCT/JP2010/063135.
Oct. 26, 2012 Office Action issued in U.S. Appl. No. 13/202,692.
Oct. 23, 2013 Office Action issued in U.S. Appl. No. 13/263,272.
Apr. 23, 2014 Office Action issued in U.S. Appl. No. 13/260,986.
Apr. 3, 2014 Office Action issued in U.S. Appl. No. 13/259,574.
Dec. 20, 2013 Office Action issued in U.S. Appl. No. 13/264,230.
Jul. 1, 2014 Office Action issued in U.S. Appl. No. 13/257,789.
Jul. 24, 2013 Office Action issued in U.S. Appl. No. 13/202,692.
May 7, 2014 Office Action issued in U.S. Appl. No. 13/264,062.
May 8, 2014 Office Action issued in U.S. Appl. No. 13/375,674.
U.S. Appl. No. 13/202,692 in the name of Umemoto et al., filed Sep. 20, 2011.
U.S. Appl. No. 13/257,789 in the name of Nishioka et al., filed Oct. 14, 2011.
U.S. Appl. No. 13/258,483 in the name of Numata et al., filed Sep. 22, 2011.

(56) References Cited

OTHER PUBLICATIONS

U.S. Appl. No. 13/259,574 in the name of Tsukamoto et al., filed Sep. 23, 2011.
U.S. Appl. No. 13/259,885 in the name of Umemoto et al., filed Sep. 23, 2011.
U.S. Appl. No. 13/260,986 in the name of Watanabe et al., filed Sep. 29, 2011.
U.S. Appl. No. 13/262,858 in the name of Bisaiji et al., filed Oct. 4, 2011.
U.S. Appl. No. 13/263,272 in the name of Bisaiji et al., filed Oct. 6, 2011.
U.S. Appl. No. 13/263,660 in the name of Umemoto et al., filed Oct. 7, 2011.
U.S. Appl. No. 13/264,062 in the name of Watanabe et al., filed Oct. 12, 2011.
U.S. Appl. No. 13/264,230 in the name of Bisaiji et al., filed Oct. 13, 2011.
U.S. Appl. No. 13/264,594 in the name of Inoue et al., filed Oct. 14, 2011.
U.S. Appl. No. 13/264,884 in the name of Bisaiji et al., filed Oct. 17, 2011.
U.S. Appl. No. 13/375,674 in the name of Inoue et al., filed Dec. 1, 2011.
U.S. Appl. No. 13/578,148 in the name of Umemoto et al., filed Aug. 9, 2012.
U.S. Appl. No. 13/581,186 in the name of Kazuhiro Umemoto et al., filed Aug. 24, 2012.
U.S. Appl. No. 13/580,000 in the name of Bisaiji et al., filed Aug. 20, 2012.
U.S. Appl. No. 13/582,862 in the name of Uenishi et al., filed Sep. 5, 2012.
U.S. Appl. No. 13/582,909 in the name of Kazuhiro Umemoto et al., filed Sep. 5, 2012.
U.S. Appl. No. 13/202,694 in the name of Bisaiji et al., filed Aug. 22, 2011.
U.S. Appl. No. 14/108,113 in the name of Bisaiji et al., filed Dec. 16, 2013.
U.S. Appl. No. 14/152,629 in the name of Umemoto et al., filed Jan. 10, 2014.
U.S. Appl. No. 13/262,001 in the name of Inoue et al., filed Oct. 19, 2011.
Nov. 22, 2010 Written Opinion issued in International Patent Application No. PCT/JP2010/065186 (with translation).
Dec. 27, 2011 Written Opinion issued in International Patent Application No. PCT/JP2011/075618.
Aug. 6, 2014 Notice of Allowance in U.S. Appl. No. 13/259,574.
Nov. 27, 2013 Notice of Allowance issued in U.S. Appl. No. 13/258,483.
Oct. 4, 2013 Notice of Allowance issued in U.S. Appl. No. 13/259,885.
Jun. 15, 2010 International Search Report issued in International Application No. PCl/JP2010/054729.
Sep. 13, 2011 International Search Report issued in International Application No. PCT/JP2011/066628 (with Translation).
U.S. Appl. No. 13/502,210 in the name of Bisaiji, filed Apr. 16, 2012.
U.S. Appl. No. 13/499,211 in the name of Bisaiji et al., filed Mar. 29, 2012.
Jan. 22, 2014 Office Action issued in U.S. Appl. No. 13/499,211.
Oct. 2, 2014 Office Action issued in U.S. Appl. No. 13/582,862.
Jul. 9, 2013 Notice of Allowance issued in U.S. Appl. No. 13/255,774.
Dec. 9, 2013 Notice of Allowance issued in U.S. Appl. No. 13/262,506.
Dec. 27, 2013 Notice of Allowance issued in U.S. Appl. No. 13/502,210.
U.S. Appl. No. 13/262,506 in the name of Bisaiji et al., filed Sep. 30, 2011.
Dec. 22, 2014 Office Action issued in U.S. Appl. No. 13/264,230.

\* cited by examiner

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the art is an internal combustion engine which arranges, in an engine exhaust passage, an $NO_x$ storage catalyst which stores NOx which is contained in exhaust gas when an air-fuel ratio of inflowing exhaust gas is lean and which releases the stored $NO_x$ when the air-fuel ratio of the inflowing exhaust gas becomes rich, which arranges, in the engine exhaust passage upstream of the $NO_x$ storage catalyst, an oxidation catalyst which has an adsorption function, and which feeds hydrocarbons into the engine exhaust passage upstream of the oxidation catalyst to make the air-fuel ratio of the exhaust gas flowing into the $NO_x$ storage catalyst rich when releasing $NO_x$ from the $NO_x$ storage catalyst (for example, see Patent Literature 1).

In this internal combustion engine, the hydrocarbons which are fed when releasing $NO_x$ from the $NO_x$ storage catalyst are made gaseous hydrocarbons at the oxidation catalyst, and the gaseous hydrocarbons are fed to the $NO_x$ storage catalyst. As a result, the $NO_x$ which is released from the $NO_x$ storage catalyst is reduced well.

CITATION LIST

Patent Literature

Patent Literature 1: Japanese Patent No. 3969450

SUMMARY OF INVENTION

Technical Problem

However, there is the problem that when the $NO_x$ storage catalyst becomes a high temperature, the $NO_x$ purification rate falls.

An object of the present invention is to provide an exhaust purification system of an internal combustion engine which can obtain a high $NO_x$ purification rate even if the temperature of the exhaust purification catalyst becomes a high temperature.

Solution to Problem

According to the present invention, there is provided an exhaust purification system of an internal combustion engine wherein a hydrocarbon feed valve for feeding hydrocarbons is arranged inside of an engine exhaust passage, an exhaust purification catalyst for reacting $NO_x$ contained in exhaust gas and reformed hydrocarbons is arranged inside of the engine exhaust passage downstream of the hydrocarbon feed valve, a precious metal catalyst is carried on an exhaust gas flow surface of the exhaust purification catalyst and a basic exhaust gas flow surface part is formed around the precious metal catalyst, the exhaust purification catalyst has a property of reducing the $NO_x$ which is contained in exhaust gas if a predetermined amount of hydrocarbons is injected by a predetermined feed period from the hydrocarbon feed valve and has a property of being increased in storage amount of $NO_x$ which is contained in exhaust gas if lengthening the feed period of the hydrocarbons from the predetermined feed period, at the time of engine operation, the predetermined amount of hydrocarbons is injected from the hydrocarbon feed valve by the predetermined feed period, and, at this time, an feed pressure of the hydrocarbons from the hydrocarbon feed valve is increased in accordance with an increase in an oxidizing strength of the exhaust purification catalyst.

Advantageous Effects of Invention

Even if the temperature of the exhaust purification catalyst becomes a high temperature, a high $NO_x$ purification rate can be obtained.

DESCRIPTION OF EMBODIMENTS

Figure 1:
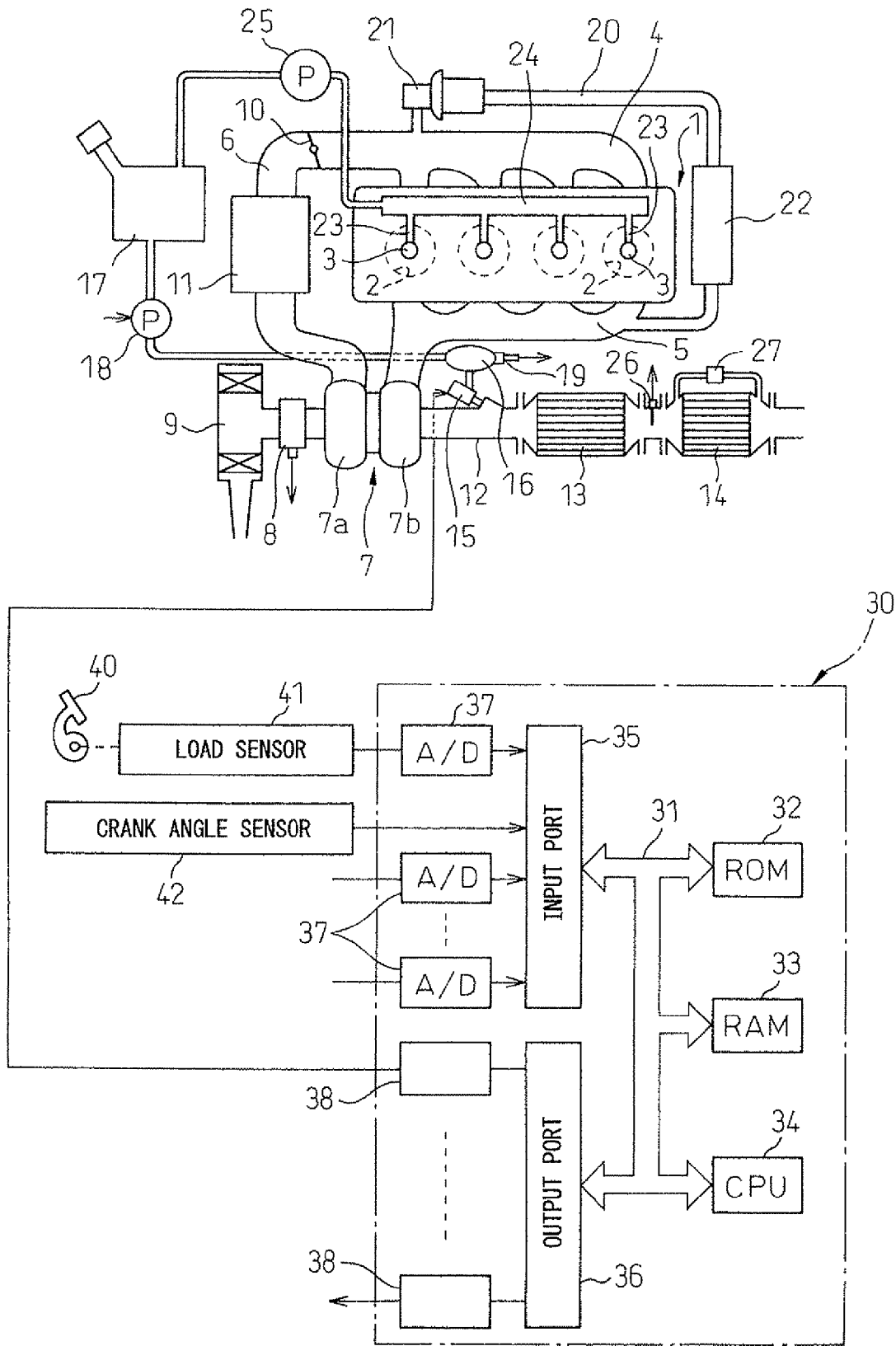
FIG. 1 is an overall view of a compression ignition type internal combustion engine.

FIG. 1 is an overall view of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air amount detector 8 to an air cleaner 9. Inside the intake duct 6, a throttle valve 10 driven by a step motor is arranged. Furthermore, around the intake duct 6, a cooling device 11 is arranged for cooling the intake air which flows through the inside of the intake duct 6. In the embodiment shown in FIG. 1, the engine cooling water is guided to the inside of the cooling device 11 where the engine cooling water is used to cool the intake air.

On the other hand, the exhaust manifold 5 is connected to an inlet of an exhaust turbine 7b of the exhaust turbocharger 7. The outlet of the exhaust turbine 7b is connected through an exhaust pipe 12 to an inlet of the exhaust purification catalyst 13, while the outlet of the exhaust purification catalyst 13 is connected to a particulate filter 14 for trapping particulate which is contained in the exhaust gas. Inside the exhaust pipe 12 upstream of the exhaust purification catalyst 13, a hydrocarbon feed valve 15 is arranged for feeding hydrocarbons comprised of diesel oil or other fuel used as fuel for a compression ignition type internal combustion engine. This hydrocarbon feed valve 15 is fed with hydrocarbons which are stored at a hydrocarbon storer 16. The hydrocarbon storer 16 is fed with fuel in the fuel tank 17, that is, hydrocarbons, through a feed pump 18. The hydrocarbon storer 16 is provided with a pressure sensor 19 for detecting the pressure of the hydrocarbons in the hydrocarbon storer 16, that is, the injection pressure of the hydrocarbons from the hydrocarbon feed valve 15. The injection pressure of the hydrocarbons is made to become a target pressure by control of the feed pump 18 based on the output signal of the pressure sensor 19.

In the embodiment shown in FIG. 1, diesel oil is used as the hydrocarbons which are fed from the hydrocarbon feed valve 15. Note that, the present invention can also be applied to a spark ignition type internal combustion engine in which fuel is burned under a lean air-fuel ratio. In this case, from the hydrocarbon feed valve 15, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 20. Inside the EGR passage 20, an electronically controlled EGR control valve 21 is arranged. Further, around the EGR passage 20, a cooling device 22 is arranged for cooling EGR gas flowing through the inside of the EGR passage 20. In the embodiment shown in FIG. 1, the engine cooling water is guided to the inside of the cooling device 22 where the engine cooling water is used to cool the EGR gas. On the other hand, each fuel injector 3 is connected through a fuel feed tube 23 to a common rail 24. This common rail 24 is connected through an electronically controlled variable discharge fuel pump 25 to a fuel tank 17. The fuel which is stored inside of the fuel tank 17 is fed by the fuel pump 25 to the inside of the common rail 24. The fuel which is fed to the inside of the common rail 24 is fed through each fuel feed tube 23 to the fuel injector 3.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. Downstream of the exhaust purification catalyst 13, a temperature sensor 26 is attached for detecting the exhaust gas temperature. At the particulate filter 14, a differential pressure sensor 27 is attached for detecting a differential pressure before and after the particulate filter 14. Output signals of this temperature sensor 26, differential pressure sensor 27, pressure sensor 19, and intake air amount detector 8 are input through respectively corresponding AD converters 37 to the input port 35. Further, the accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, a step motor for driving the throttle valve 10, hydrocarbon feed valve 15, feed pump 18, EGR control valve 21, and fuel pump 25.

Figure 2:
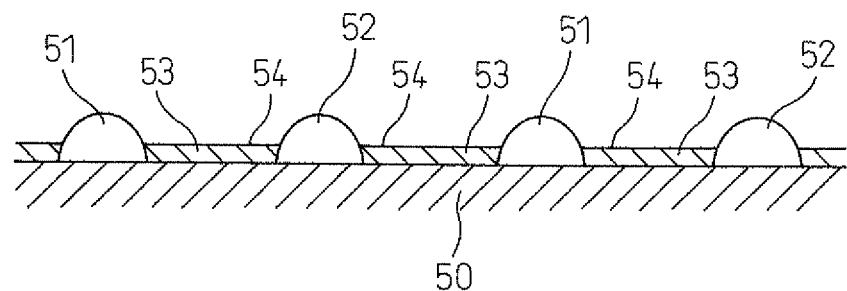
FIG. 2 is a view schematically showing a surface part of a catalyst carrier.

FIG. 2 schematically shows a surface part of a catalyst carrier which is carried on a substrate of the exhaust purification catalyst 13. At this exhaust purification catalyst 13, as shown in FIG. 2, for example, there is provided a catalyst carrier 50 made of alumina on which precious metal catalysts 51 and 52 are carried. Furthermore, on this catalyst carrier 50, a basic layer 53 is formed which includes at least one element selected from potassium K, sodium Na, cesium Cs, or another such alkali metal, barium Ba, calcium Ca, or another such alkali earth metal, a lanthanoid or another such rare earth and silver Ag, copper Cu, iron Fe, iridium Ir, or another metal able to donate electrons to $NO_x$. The exhaust gas flows along the top of the catalyst carrier 50, so the precious metal catalysts 51 and 52 can be said to be carried on the exhaust gas flow surface of the exhaust purification catalyst 13. Further, the surface of the basic layer 53 exhibits basicity, so the surface of the basic layer 53 is called the basic exhaust gas flow surface part 54.

On the other hand, in FIG. 2, the precious metal catalyst 51 is comprised of platinum Pt, while the precious metal catalyst 52 is comprised of rhodium Rh. That is, the precious metal catalysts 51 and 52 which are carried on the catalyst carrier 50 are comprised of platinum Pt and rhodium Rh. Note that, on the catalyst carrier 50 of the exhaust purification catalyst 13, in addition to platinum Pt and rhodium Rh, palladium Pd may be further carried or, instead of rhodium Rh, palladium Pd may be carried. That is, the precious metal catalysts 51 and 52 which are carried on the catalyst carrier 50 are comprised of platinum Pt and at least one of rhodium Rh and palladium Pd.

Figure 3:
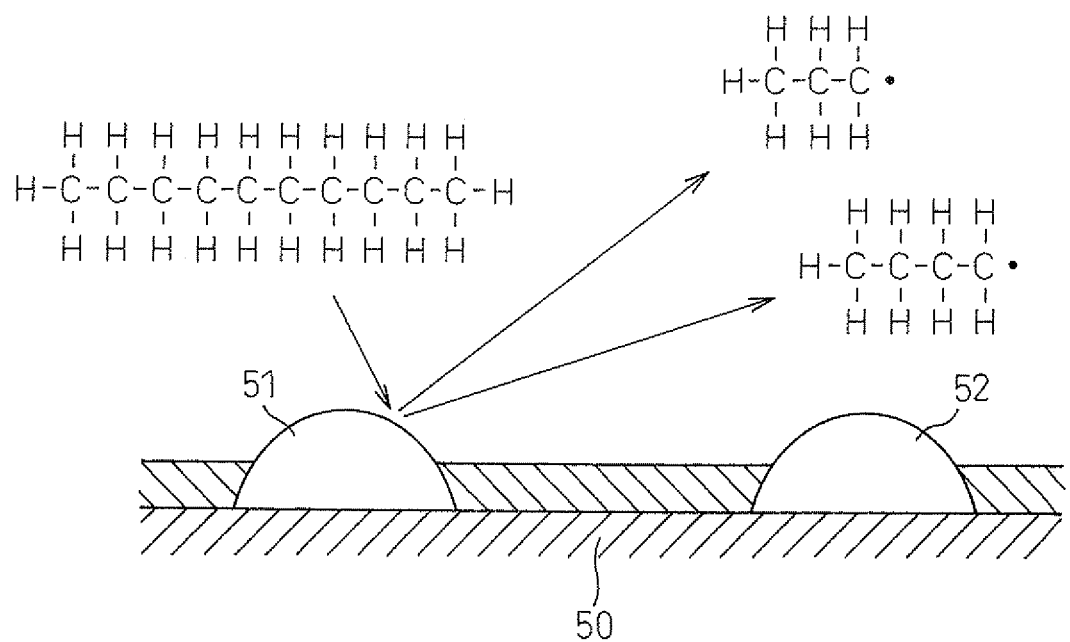
FIG. 3 is a view for explaining an oxidation reaction in an exhaust purification catalyst.

If hydrocarbons are injected from the hydrocarbon feed valve 15 into the exhaust gas, the hydrocarbons are reformed by the exhaust purification catalyst 13. In the present invention, at this time, the reformed hydrocarbons are used to remove the $NO_x$ at the exhaust purification catalyst 13. FIG. 3 schematically shows the reforming action performed at the exhaust purification catalyst 13 at this time. As shown in FIG.

3, the hydrocarbons HC which are injected from the hydrocarbon feed valve 15 become radical hydrocarbons HC with a small carbon number by the catalyst 51.

Figure 4:
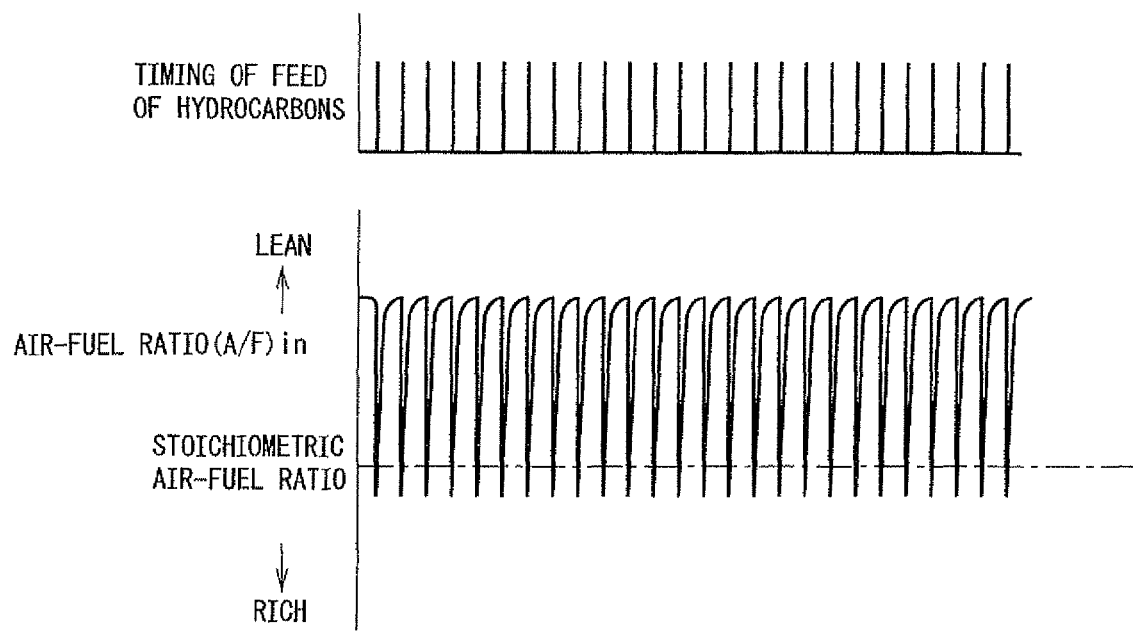
FIG. 4 is a view showing a change of an air-fuel ratio of exhaust gas flowing into an exhaust purification catalyst.

FIG. 4 shows the timing of feeding hydrocarbons from the hydrocarbon feed valve 15 and the changes in the air-fuel ratio (A/F) in of the exhaust gas flowing into the exhaust purification catalyst 13. Note that, the changes in the air-fuel ratio (A/F) in depend on the change in concentration of the hydrocarbons in the exhaust gas which flows into the exhaust purification catalyst 13, so it can be said that the change in the air-fuel ratio (A/F) in shown in FIG. 4 expresses the change in concentration of the hydrocarbons. However, if the hydrocarbon concentration becomes higher, the air-fuel ratio (A/F) in becomes smaller, so, in FIG. 4, the more to the rich side the air-fuel ratio (A/F) in becomes, the higher the hydrocarbon concentration.

Figure 5:
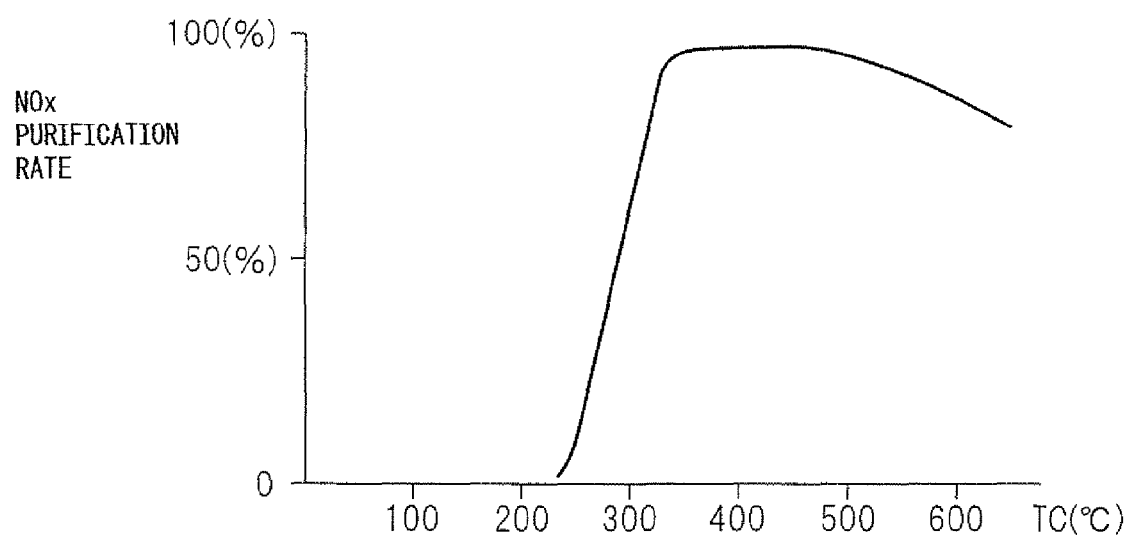
FIG. 5 is a view showing an $NO_x$ purification rate.

FIG. 5 shows the $NO_x$ purification rate by the exhaust purification catalyst 13 with respect to the catalyst temperatures of the exhaust purification catalyst 13 when periodically making the concentration of hydrocarbons flowing into the exhaust purification catalyst 13 change so as to, as shown in FIG. 4, make the air-fuel ratio (A/F) in of the exhaust gas flowing to the exhaust purification catalyst 13 change. The inventors engaged in research relating to $NO_x$ purification for a long time. In the process of research, they learned that if making the concentration of hydrocarbons flowing into the exhaust purification catalyst 13 vibrate by within a predetermined range of amplitude and within a predetermined range of period, as shown in FIG. 5, an extremely high $NO_x$ purification rate is obtained even in a 400° C. or higher high temperature region.

Figure 6A:
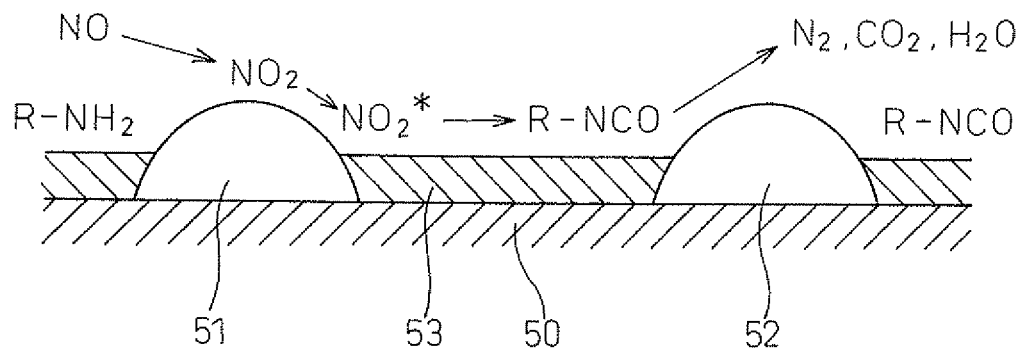
FIGS. 6A and 6B are views for explaining an oxidation reduction reaction in an exhaust purification catalyst.
Figure 6B:
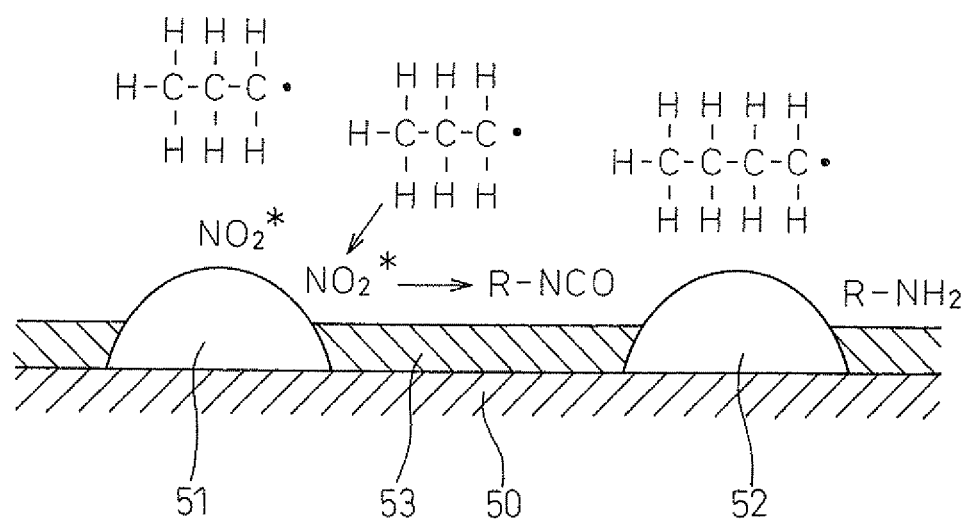

Furthermore, at this time, a large amount of reducing intermediate containing nitrogen and hydrocarbons continues to be held or adsorbed on the surface of the basic layer 53, that is, on the basic exhaust gas flow surface part 54 of the exhaust purification catalyst 13. It is learned that this reducing intermediate plays a central role in obtaining a high $NO_x$ purification rate. Next, this will be explained with reference to FIGS. 6A and 6B. Note that, these FIGS. 6A and 6B schematically show the surface part of the catalyst carrier 50 of the exhaust purification catalyst 13. These FIGS. 6A and 6B show the reaction which is presumed to occur when the concentration of hydrocarbons flowing into the exhaust purification catalyst 13 is made to vibrate by within a predetermined range of amplitude and within a predetermined range of period.

FIG. 6A shows when the concentration of hydrocarbons flowing into the exhaust purification catalyst 13 is low, while FIG. 6B shows when hydrocarbons are fed from the hydrocarbon feed valve 15 and the concentration of hydrocarbons flowing into the exhaust purification catalyst 13 becomes higher.

Now, as will be understood from FIG. 4, the air-fuel ratio of the exhaust gas which flows into the exhaust purification catalyst 13 is maintained lean except for an instant, so the exhaust gas which flows into the exhaust purification catalyst 13 normally becomes a state of oxygen excess. Therefore, the NO which is contained in the exhaust gas, as shown in FIG. 6A, is oxidized on the platinum 51 and becomes $NO_2$. Next, this $NO_2$ is supplied with electrons from the platinum 51 and becomes $NO_2^-$. Therefore, a large amount of $NO_2^-$ is produced on the platinum 51. This $NO_2^-$ is strong in activity. Above, this $NO_2^-$ is called the active $NO_2^*$.

On the other hand, if hydrocarbons are fed from the hydrocarbon feed valve 15, as shown in FIG. 3, the hydrocarbons are reformed and become radicalized inside of the exhaust purification catalyst 13. As a result, as shown in FIG. 6B the hydrocarbon concentration around the active $NO_2^*$ becomes higher. In this regard, after the active $NO_2^*$ is produced, if the state of a high oxygen concentration around the active $NO_2^*$ continues for a predetermined time or more, the active $NO_2^*$ is oxidized and is absorbed in the basic layer 53 in the form of nitrate ions $NO_3^-$. However, if the hydrocarbon concentration around the active $NO_2^*$ is made higher before this predetermined time passes, as shown in FIG. 6B, the active $NO_2^*$ reacts on the platinum 51 with the radical hydrocarbons HC whereby a reducing intermediate is produced. This reducing intermediate is adhered or adsorbed on the surface of the basic layer 53.

Note that, at this time, the first produced reducing intermediate is considered to be a nitro compound R—$NO_2$. If this nitro compound R—$NO_2$ is produced, the result becomes a nitrile compound R—CN, but this nitrile compound R—CN can only survive for an instant in this state, so immediately becomes an isocyanate compound R—NCO. This isocyanate compound R—NCO, when hydrolyzed, becomes an amine compound R—$NH_2$. However, in this case, what is hydrolyzed is considered to be part of the isocyanate compound R—NCO. Therefore, as shown in FIG. 6B, the majority of the reducing intermediate which is held or adsorbed on the surface of the basic layer 53 is believed to be the isocyanate compound R—NCO and amine compound R—$NH_2$.

On the other hand, as shown in FIG. 6B, if the produced reducing intermediate is surrounded by the hydrocarbons HC, the reducing intermediate is blocked by the hydrocarbons HC and the reaction will not proceed any further. In this case, if the concentration of hydrocarbons flowing into the exhaust purification catalyst 13 is lowered and thereby the oxygen concentration becomes higher, the hydrocarbons around the reducing intermediate will be oxidized. As a result, as shown in FIG. 6A, the reducing intermediate and the active $NO_2^*$ will react. At this time, the active $NO_2^*$ reacts with the reducing intermediate R—NCO or R—$NH_2$ to form $N_2$, $CO_2$, and $H_2O$ and consequently the $NO_x$ is removed.

In this way, in the exhaust purification catalyst 13, by making the concentration of hydrocarbons flowing into the exhaust purification catalyst 13 higher, a reducing intermediate is produced. By making the concentration of hydrocarbons flowing into the exhaust purification catalyst 13 lower and raising the oxygen concentration, the active $NO_2^*$ reacts with the reducing intermediate and the $NO_x$ is removed. That is, in order for the exhaust purification catalyst 13 to remove the $NO_x$, the concentration of hydrocarbons flowing into the exhaust purification catalyst 13 has to be periodically changed.

Of course, in this case, it is necessary to raise the concentration of hydrocarbons to a concentration sufficiently high for producing the reducing intermediate and it is necessary to lower the concentration of hydrocarbons to a concentration sufficiently low for making the produced reducing intermediate react with the active $NO_2^*$. That is, the concentration of hydrocarbons flowing into the exhaust purification catalyst 13 has to be made to vibrate within a predetermined range of amplitude. Note that, in this case, a sufficient amount of reducing intermediate R—NCO or R—$NH_2$ has to be held on the basic layer 53, that is, on the basic exhaust gas flow surface part 24, until the produced reducing intermediate reacts with the active $NO_2^*$. For this reason, the basic exhaust gas flow surface part 24 is provided.

On the other hand, if lengthening the feed period of the hydrocarbons, the time in which the oxygen concentration becomes higher becomes longer in the period after the hydrocarbons are fed until the hydrocarbons are next fed. Therefore, the active $NO_2^*$ is absorbed in the basic layer 53 in the form of nitrates without producing a reducing intermediate.

To avoid this, it is necessary to make the concentration of hydrocarbons flowing into the exhaust purification catalyst 13 vibrate by within a predetermined range of period.

Therefore, in an embodiment of the present invention, to make the $NO_x$ contained in the exhaust gas and the reformed hydrocarbons react and produce the reducing intermediate R—NCO or R—$NH_2$ containing nitrogen and hydrocarbons, precious metal catalysts 51 and 52 are carried on the exhaust gas flow surface of the exhaust purification catalyst 13. To hold the produced reducing intermediate R—NCO or R—$NH_2$ inside the exhaust purification catalyst 13, a basic exhaust gas flow surface part 54 is formed around the precious metal catalysts 51 and 52. Due to the reducing action of the reducing intermediate R—NCO or R—$NH_2$ which is held on the basic exhaust gas flow surface part 54, the $NO_x$ is reduced. The vibration period of the hydrocarbon concentration is made the vibration period required for continuation of the production of the reducing intermediate R—NCO or R—$NH_2$. Incidentally, in the example shown in FIG. 4, the injection interval is made 3 seconds.

Figure 7A:
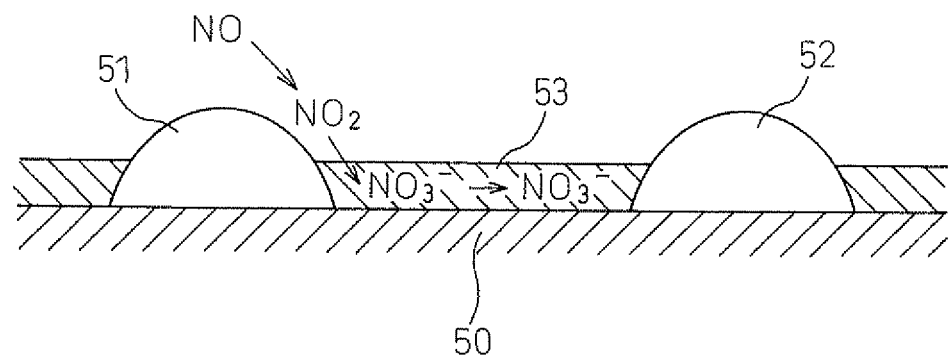
FIGS. 7A and 7B are views for explaining an oxidation reduction reaction in an exhaust purification catalyst.

If the vibration period of the hydrocarbon concentration, that is, the feed period of the hydrocarbons HC, is made longer than the above predetermined range of period, the reducing intermediate R—NCO or R—$NH_2$ disappears from the surface of the basic layer 53. At this time, the active $NO_2^*$ which is produced on the platinum Pt 53, as shown in FIG. 7A, diffuses in the basic layer 53 in the form of nitrate ions $NO_3^-$ and becomes nitrates. That is, at this time, the $NO_x$ in the exhaust gas is absorbed in the form of nitrates inside of the basic layer 53.

Figure 7B:
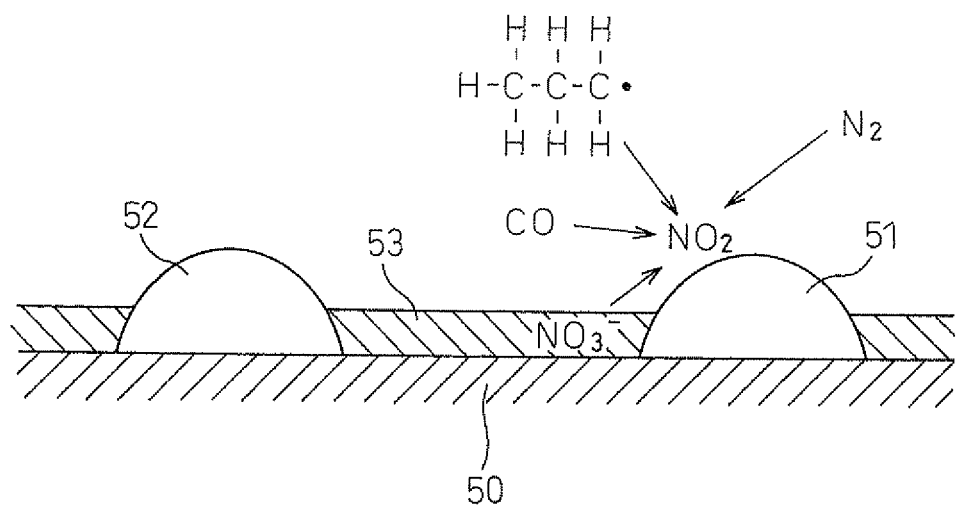

On the other hand, FIG. 7B shows the case where the air-fuel ratio of the exhaust gas which flows into the exhaust purification catalyst 13 is made the stoichiometric air-fuel ratio or rich when the $NO_x$ is absorbed in the form of nitrates inside of the basic layer 53. In this case, the oxygen concentration in the exhaust gas falls, so the reaction proceeds in the opposite direction ($NO_3^- \rightarrow NO_2$), and consequently the nitrates absorbed in the basic layer 53 become nitrate ions $NO_3-$ one by one and, as shown in FIG. 7S, are released from the basic layer 53 in the form of $NO_2$. Next, the released $NO_2$ is reduced by the hydrocarbons HC and CO contained in the exhaust gas.

Figure 8:
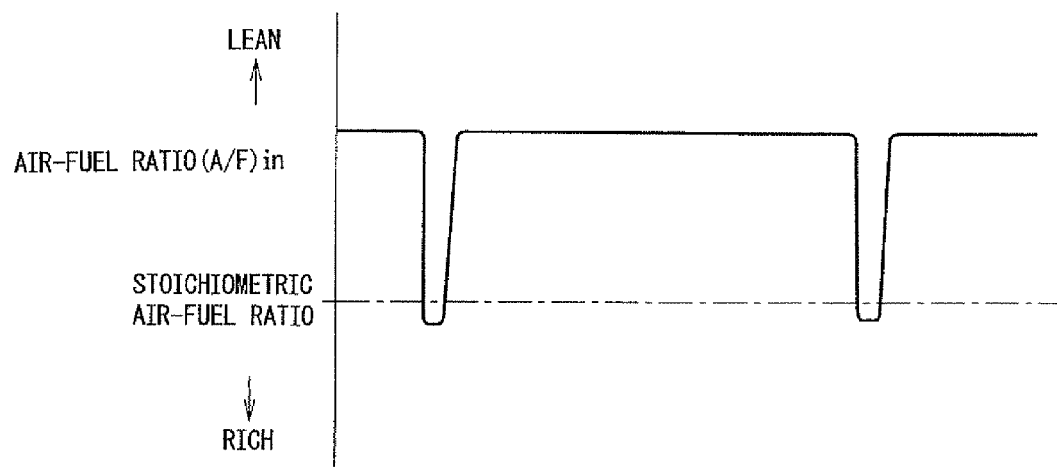
FIG. 8 is a view showing a change of an air-fuel ratio of exhaust gas flowing into an exhaust purification catalyst.

FIG. 8 shows the case of making the air-fuel ratio (A/F) in of the exhaust gas which flows into the exhaust purification catalyst 13 temporarily rich slightly before the $NO_x$ absorption ability of the basic layer 53 becomes saturated. Note that, in the example shown in FIG. 8, the time interval of this rich control is 1 minute or more. In this case, the $NO_x$ which was absorbed in the basic layer 53 when the air-fuel ratio (A/F) in of the exhaust gas was lean is released all at once from the basic layer 53 and reduced when the air-fuel ratio (A/F) in of the exhaust gas is made temporarily rich. Therefore, in this case, the basic layer 53 plays the role of an absorbent for temporarily absorbing $NO_x$.

Note that, at this time, sometimes the basic layer 53 temporarily adsorbs the $NO_x$. Therefore, if using the term of storage as a term including both absorption and adsorption, at this time, the basic layer 53 performs the role of an $NO_x$ storage agent for temporarily storing the $NO_x$. That is, in this case, if the ratio of the air and fuel (hydrocarbons) which are fed into the engine intake passage, combustion chambers 2, and exhaust passage upstream of the exhaust purification catalyst 13 is called the air-fuel ratio of the exhaust gas, the exhaust purification catalyst 13 functions as an $NO_x$ storage catalyst which stores the $NO_x$ when the air-fuel ratio of the exhaust gas is lean and releases the stored $NO_x$ when the oxygen concentration in the exhaust gas falls.

Figure 9:
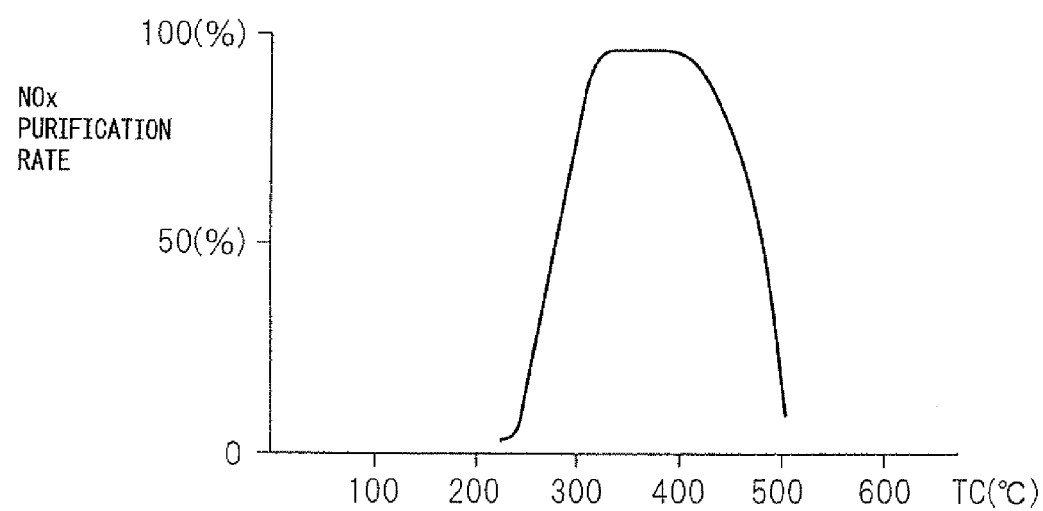
FIG. 9 is a view of an $NO_x$ purification rate.

FIG. 9 shows the $NO_x$ purification rate when making the exhaust purification catalyst 13 function as an $NO_x$ storage catalyst in this way. Note that, the abscissa of the FIG. 9 shows the catalyst temperature TC of the exhaust purification catalyst 13. When making the exhaust purification catalyst 13 function as an $NO_x$ storage catalyst, as shown in FIG. 9, when the catalyst temperature TC is 300° C. to 400° C., an extremely high $NO_x$ purification rate is obtained, but when the catalyst temperature TC becomes a 400° C. or higher high temperature, the $NO_x$ purification rate falls.

In this way, when the catalyst temperature TC becomes 400° C. or more, the $NO_x$ purification rate falls because if the catalyst temperature TC becomes 400° C. or more, the nitrates break down by heat and are released in the form of $NO_2$ from the exhaust purification catalyst 13. That is, so long as storing $NO_x$ in the form of nitrates, when the catalyst temperature TC is high, it is difficult to obtain a high $NO_x$ purification rate. However, in the new $NO_x$ purification method shown from FIG. 4 to FIGS. 6A and 6B, as will be understood from FIGS. 6A and 6B, nitrates are not formed or even if formed are extremely fine in amount, consequently, as shown in FIG. 5, even when the catalyst temperature TC is high, a high $NO_x$ purification rate is obtained.

Therefore, in the present invention, a hydrocarbon feed valve 15 for feeding hydrocarbons is arranged inside of an engine exhaust passage, an exhaust purification catalyst 13 for reacting $NO_x$ contained in exhaust gas and reformed hydrocarbons is arranged inside of an engine exhaust passage downstream of the hydrocarbon feed valve 15, and precious metal catalysts 51 and 52 are carried on the exhaust gas flow surface of the exhaust purification catalyst 13. Around the precious metal catalysts 51 and 52, a basic exhaust gas flow surface part 54 is formed. The exhaust purification catalyst 13 has the property of reducing the $NO_x$ which is contained in exhaust gas if the hydrocarbon feed valve 15 injects a predetermined amount of hydrocarbons in a predetermined feed period and has the property of being increased in the storage amount of $NO_x$ which is contained in exhaust gas if the feed period of the hydrocarbons is made longer than the predetermined feed period. At the time of engine operation, the hydrocarbon feed valve 15 injects the predetermined amount of hydrocarbons by the predetermined feed period. Due to this, the $NO_x$ which is contained in the exhaust gas is reduced in the exhaust purification catalyst 13.

That is, the $NO_x$ purification method which is shown from FIG. 4 to FIGS. 6A and 6B can be said to be a new $NO_x$ purification method designed to remove $NO_x$ without forming almost any nitrates in the case of using an exhaust purification catalyst which carries a precious metal catalyst and forms a basic layer which can absorb $NO_x$. In actuality, when using this new $NO_x$ purification method, the nitrates which are detected from the basic layer 53 become much smaller in amount compared with the case where making the exhaust purification catalyst 13 function as an $NO_x$ storage catalyst.

Next, referring to FIG. 10 to FIG. 15, the new $NO_x$ purification method which is shown in FIG. 4 to FIGS. 6A and 6B will be explained in a bit more detail.

Figure 10:
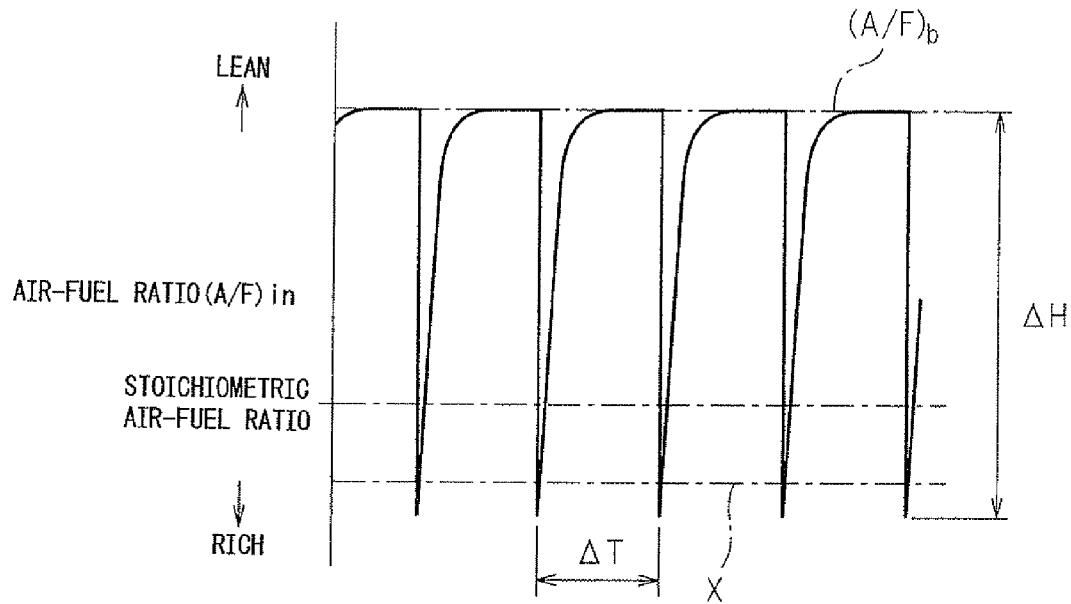
FIG. 10 is a time chart showing a change of an air-fuel ratio of exhaust gas flowing into an exhaust purification catalyst.

FIG. 10 shows enlarged the change in the air-fuel ratio (A/F) in shown in FIG. 4. Note that, as explained above, the change in the air-fuel ratio (A/F) in of the exhaust gas flowing into this exhaust purification catalyst 13 simultaneously shows the change in concentration of the hydrocarbons which flow into the exhaust purification catalyst 13. Note that, in FIG. 10, ΔH shows the amplitude of the change in concentration of hydrocarbons HC which flow into the exhaust purification catalyst 13, while ΔT shows the vibration period of the concentration of the hydrocarbons which flow into the exhaust purification catalyst 13.

Furthermore, in FIG. 10, (A/F)b shows the base air-fuel ratio which shows the air-fuel ratio of the combustion gas for generating the engine output. In other words, this base air-fuel ratio (A/F)b shows the air-fuel ratio of the exhaust gas which flows into the exhaust purification catalyst 13 when stopping the feed of hydrocarbons. On the other hand, in FIG. 10, X shows the upper limit of the air-fuel ratio (A/F) in which is used for producing the reducing intermediate without the produced active $NO_2^*$ being stored in the form of nitrates inside the basic layer 53. To make the active $NO_2^*$ and the modified hydrocarbons react and produce the reducing intermediate, it is necessary to make the air-fuel ratio (A/F) in lower than the upper limit X of this air-fuel ratio.

In other words, in FIG. 10, X shows the lower limit of the concentration of hydrocarbons required for making the active $NO_2^*$ and reformed hydrocarbon react to produce a reducing intermediate. To produce the reducing intermediate, the concentration of hydrocarbons has to be made higher than this lower limit X. In this case, whether the reducing intermediate is produced is determined by the ratio of the oxygen concentration and hydrocarbon concentration around the active $NO_2^*$, that is, the air-fuel ratio (A/F) in. The upper limit X of the air-fuel ratio required for producing the reducing intermediate will below be called the demanded minimum air-fuel ratio.

In the example shown in FIG. 10, the demanded minimum air-fuel ratio X is rich, therefore, in this case, to form the reducing intermediate, the air-fuel ratio (A/F) in is instantaneously made the demanded minimum air-fuel ratio X or less, that is, is made rich. As opposed to this, in the example shown in FIG. 11, the demanded minimum air-fuel ratio X becomes lean. In this case, the reducing intermediate is produced by maintaining the air-fuel ratio (A/F) in lean and periodically reducing the air-fuel ratio (A/F) in.

In this case, whether the demanded minimum air-fuel ratio X becomes rich or becomes lean depends on the oxidizing strength of the exhaust purification catalyst 13. In this case, the exhaust purification catalyst 13, for example, becomes stronger in oxidizing strength if increasing the carried amount of the precious metal 51 and becomes stronger in oxidizing strength if strengthening the acidity. Therefore, the oxidizing strength of the exhaust purification catalyst 13 changes due to the carried amount of the precious metal 51 or the strength of the acidity.

Figure 11:
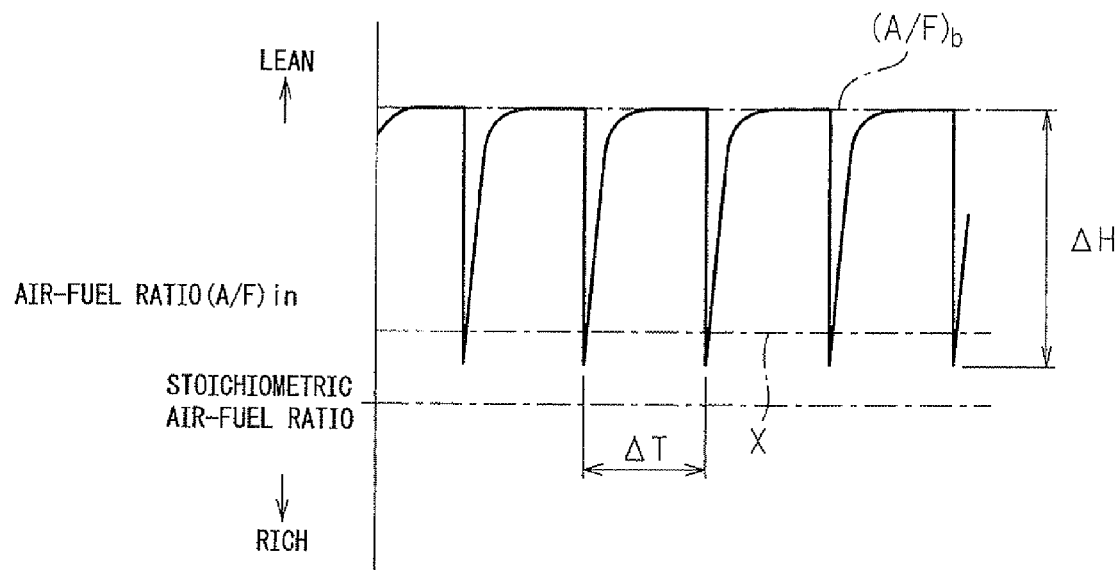
FIG. 11 is a time chart showing a change of an air-fuel ratio of exhaust gas flowing into an exhaust purification catalyst.

Now, if using an exhaust purification catalyst 13 with a strong oxidizing strength, as shown in FIG. 11, if maintaining the air-fuel ratio (A/F) in lean while periodically lowering the air-fuel ratio (A/F) in, the hydrocarbons end up becoming completely oxidized when the air-fuel ratio (A/F) in is reduced. As a result, the reducing intermediate can no longer be produced. As opposed to this, when using an exhaust purification catalyst 13 with a strong oxidizing strength, as shown in FIG. 10, if making the air-fuel ratio (A/F) in periodically rich, when the air-fuel ratio (A/F) in is made rich, the hydrocarbons will be partially oxidized, without being completely oxidized, that is, the hydrocarbons will be modified, consequently the reducing intermediate will be produced. Therefore, when using an exhaust purification catalyst 13 with a strong oxidizing strength, the demanded minimum air-fuel ratio X has to be made rich.

On the other hand, when using an exhaust purification catalyst 13 with a weak oxidizing strength, as shown in FIG. 11, if maintaining the air-fuel ratio (A/F) in lean while periodically lowering the air-fuel ratio (A/F) in, the hydrocarbons will be partially oxidized without being completely oxidized, that is, the hydrocarbons will be reformed and consequently the reducing intermediate will be produced. As opposed to this, when using an exhaust purification catalyst 13 with a weak oxidizing strength, as shown in FIG. 10, if making the air-fuel ratio (A/F) in periodically rich, a large amount of hydrocarbons will be exhausted from the exhaust purification catalyst 13 without being oxidized and consequently the amount of hydrocarbons which is wastefully consumed will increase. Therefore, when using an exhaust purification catalyst 13 with a weak oxidizing strength, the demanded minimum air-fuel ratio X has to be made lean.

Figure 12:
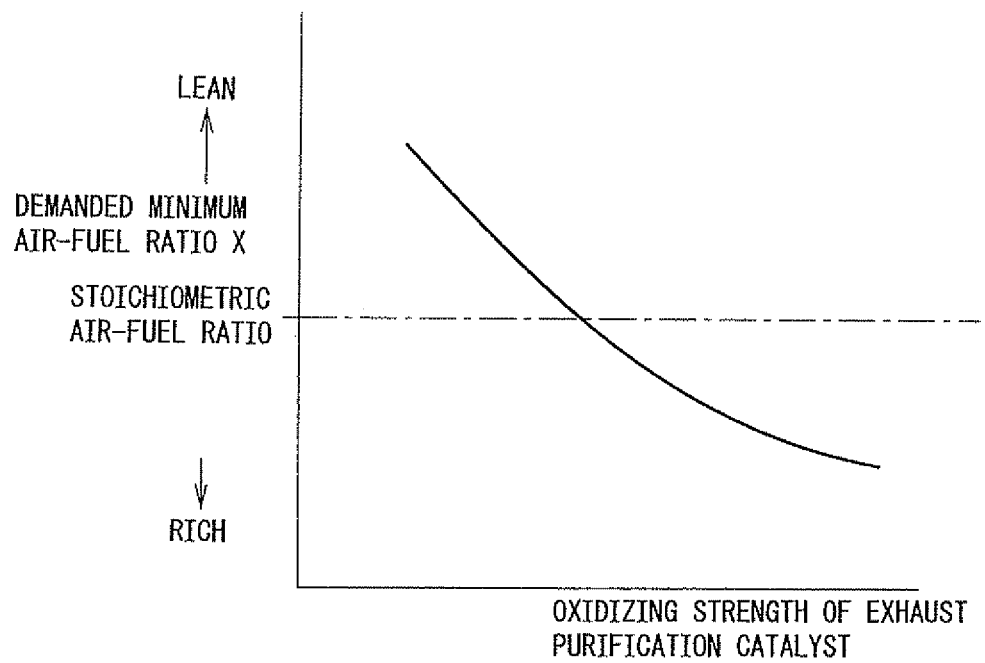
FIG. 12 is a view showing a relationship between an oxidizing strength of an exhaust purification catalyst and a demanded minimum air-fuel ratio X.

That is, it is learned that the demanded minimum air-fuel ratio X, as shown in FIG. 12, is reduced the stronger the oxidizing strength of the exhaust purification catalyst 13. In this way the demanded minimum air-fuel ratio X becomes lean or rich due to the oxidizing strength of the exhaust purification catalyst 13. Below, taking as example the case where the demanded minimum air-fuel ratio X is rich, the amplitude of the change in concentration of hydrocarbons flowing into the exhaust purification catalyst 13 and the vibration period of the concentration of hydrocarbons flowing into the exhaust purification catalyst 13 will be explained.

Now, if the base air-fuel ratio (A/F)b becomes larger, that is, if the oxygen concentration in the exhaust gas before the hydrocarbons are fed becomes higher, the feed amount of hydrocarbons required for making the air-fuel ratio (A/F) in the demanded minimum air-fuel ratio X or less increases and along with this the excess amount of hydrocarbons which does not contribute the production of the reducing intermediate also increases. In this case, to remove the $NO_x$ well, as explained above, it is necessary to make the excess hydrocarbons oxidize. Therefore, to remove the $NO_x$ well, the larger the amount of excess hydrocarbons, the larger the amount of oxygen which is required.

In this case, if raising the oxygen concentration in the exhaust gas, the amount of oxygen can be increased. Therefore, to remove the $NO_x$ well, when the oxygen concentration in the exhaust gas before the hydrocarbons are fed is high, it is necessary to raise the oxygen concentration in the exhaust gas after feeding the hydrocarbons. That is, the higher the oxygen concentration in the exhaust gas before the hydrocarbons are fed, the larger the amplitude of the hydrocarbon concentration that has to be made.

Figure 13:
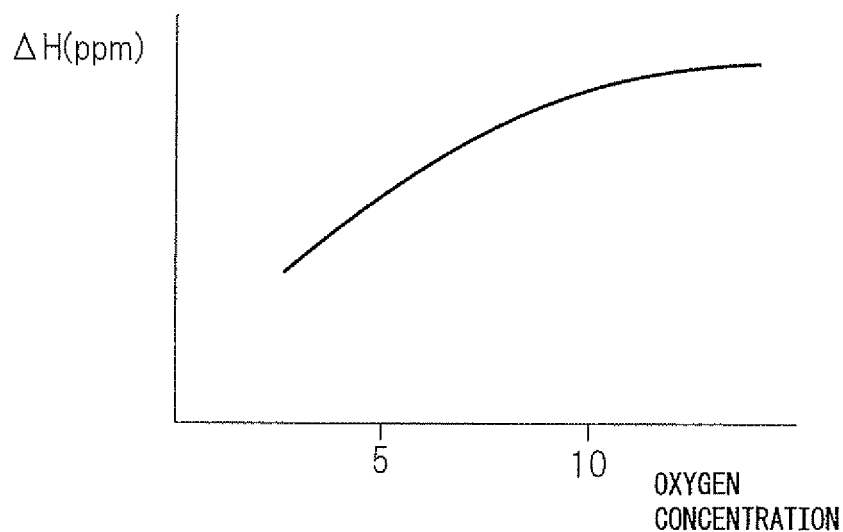
FIG. 13 is a view showing a relationship between an oxygen concentration in exhaust gas and an amplitude ΔH of a hydrocarbon concentration giving the same $NO_x$ purification rate.

FIG. 13 shows the relationship between the oxygen concentration in the exhaust gas before the hydrocarbons are fed and the amplitude ΔH of the hydrocarbon concentration when the same $NO_x$ purification rate is obtained. To obtain the same $NO_x$ purification rate, from FIG. 13, it is learned that the higher the oxygen concentration in the exhaust gas before the hydrocarbons are fed, the greater the amplitude ΔH of the hydrocarbon concentration that has to be made. That is, to obtain the same $NO_x$ purification rate, the higher the base air-fuel ratio (A/F)b, the greater the amplitude ΔT of the hydrocarbon concentration has to be made. In other words, to remove the $NO_x$ well, the lower the base air-fuel ratio (A/F)b, the more the amplitude ΔT of the hydrocarbon concentration can be reduced.

Figure 14:
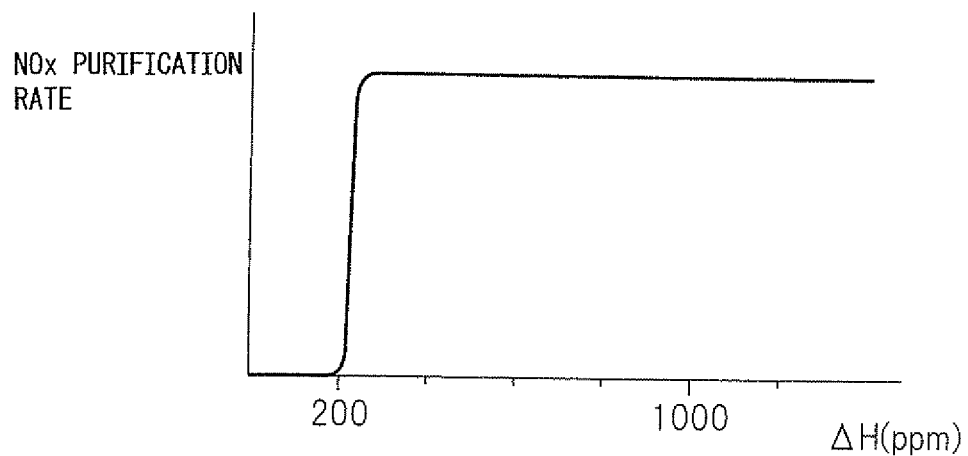
FIG. 14 is a view showing a relationship between an amplitude ΔH of a hydrocarbon concentration and an $NO_x$ purification rate.

In this regard, the base air-fuel ratio (A/F)b becomes the lowest at the time of an acceleration operation. At this time, if the amplitude ΔH of the hydrocarbon concentration is about 200 ppm, it is possible to remove the $NO_x$ well. The base air-fuel ratio (A/F)b is normally larger than the time of acceleration operation. Therefore, as shown in FIG. 14, if the amplitude ΔH of the hydrocarbon concentration is 200 ppm or more, an excellent $NO_x$ purification rate can be obtained.

On the other hand, it is learned that when the base air-fuel ratio (A/F)b is the highest, if making the amplitude ΔH of the hydrocarbon concentration 10000 ppm or so, an excellent NOx purification rate is obtained. Further, if the amplitude ΔH of the hydrocarbon concentration is over 10000 ppm, there is the danger that the air-fuel ratio (A/F) in will become rich. Therefore, there is the danger that the new $NO_x$ purification method which is shown from FIG. 4 to FIGS. 6A and 6B can no longer be performed. Therefore, in the present invention, the predetermined range of the amplitude of the hydrocarbon concentration is made 200 ppm to 10000 ppm.

Figure 15:
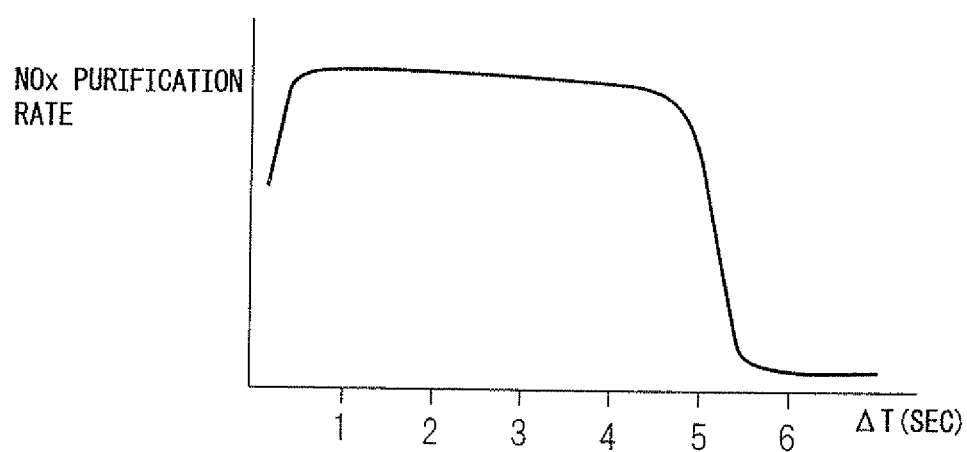
FIG. 15 is a view showing a relationship of a vibration period ΔT of a hydrocarbon concentration and an $NO_x$ purification rate.

Further, if the vibration period ΔT of the hydrocarbon concentration becomes longer, the oxygen concentration around the active $NO_2^*$ becomes higher in the time after the hydrocarbons are fed to when the hydrocarbons are next fed. In this case, if the vibration period ΔT of the hydrocarbon concentration becomes longer than about 5 seconds, the active $NO_2^*$ starts to be absorbed in the form of nitrates inside the basic layer 53. Therefore, as shown in FIG. 15, if the vibration period ΔT of the hydrocarbon concentration becomes longer than about 5 seconds, the $NO_x$ purification rate falls. Therefore, the vibration period ΔT of the hydrocarbon concentration has to be made 5 seconds or less.

On the other hand, if the vibration period ΔT of the hydrocarbon concentration becomes about 0.3 second or less, the fed hydrocarbons start to build up on the exhaust gas flow surface of the exhaust purification catalyst 13, therefore, as shown in FIG. 15, if the vibration period ΔT of the hydrocarbon concentration becomes about 0.3 second or less, the $NO_x$ purification rate falls. Therefore, in the present invention, the vibration period of the hydrocarbon concentration is made from 0.3 second to 5 seconds.

Now, in the present invention, by changing the injection amount and injection timing of hydrocarbons from the hydrocarbon feed valve 15, the amplitude ΔH and the vibration period ΔT of the hydrocarbon concentration are controlled to the optimum values in accordance with the operating state of the engine, that is, so that a good $NO_x$ purification action is performed by the new $NO_x$ purification method. In this case, in this embodiment of the present invention, the injection amount of hydrocarbons is determined by controlling the injection pressure and injection time of the hydrocarbons of the hydrocarbon feed valve 15.

Figure 16:
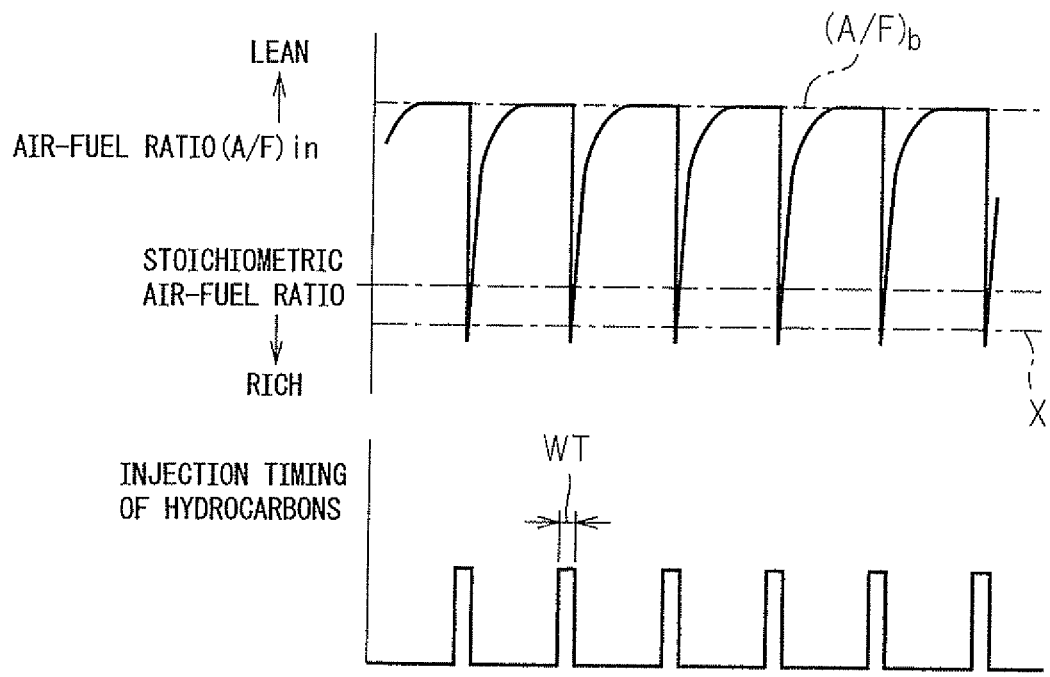
FIG. 16 is a time chart showing changes in an air-fuel ratio of exhaust gas flowing into an exhaust purification catalyst etc.
Figure 17:
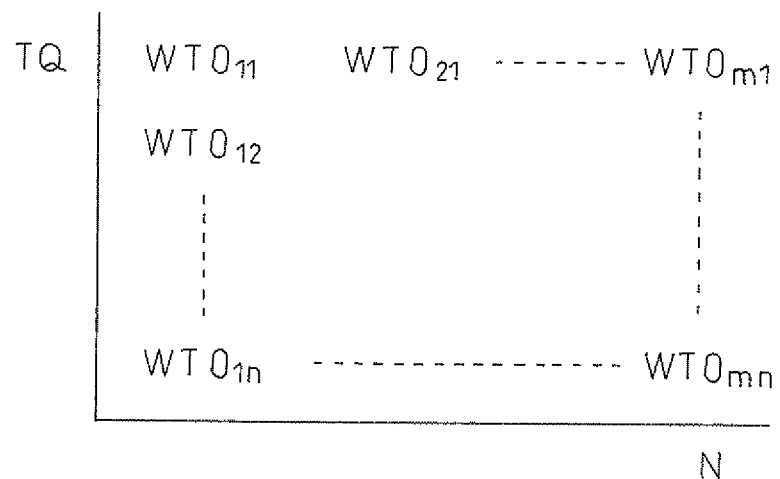
FIG. 17 is a view showing a map of an injection time WT of hydrocarbons.

FIG. 16 shows the change in concentration of hydrocarbons flowing to the exhaust purification catalyst 13, that is, the change in the air-fuel ratio (A/F) in of the exhaust gas flowing to the exhaust purification catalyst 13, and the injection amount W of hydrocarbons in a certain representative engine operating state. The injection time WT of hydrocarbons which enables a good $NO_x$ purification action to be secured by the new $NO_x$ purification method changes in accordance with the operating state of the engine. In this embodiment according to the present invention, the reference injection time WT0 of the hydrocarbons when the injection pressure WP of hydrocarbons is the reference injection pressure WP0 is stored as a function of the required, torque TQ of the engine and the engine speed N in the form of a map such as shown in FIG. 17 in advance in the ROM 32.

Figure 18A:
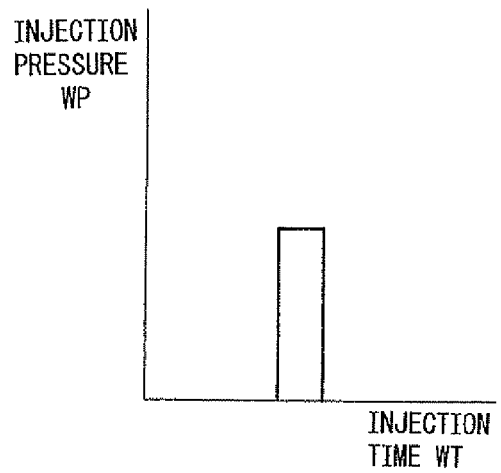
FIGS. 18A and 18B are views showing relationships between an injection pressure WP and injection time WT of hydrocarbons.
Figure 18B:
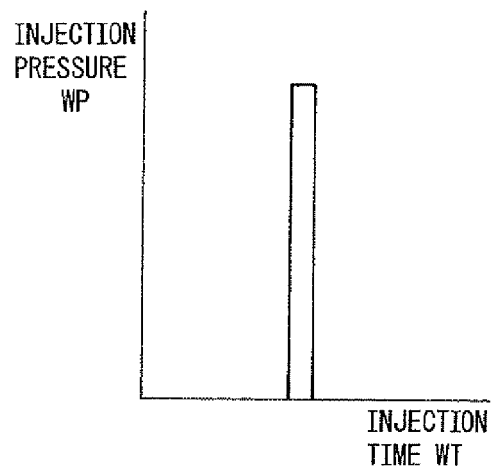
Figure 19A:
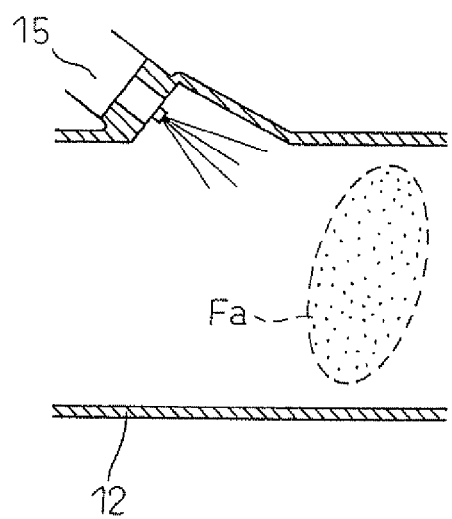
FIGS. 19A and 19B are views showing atomized fuel of hydrocarbons.
Figure 19B:
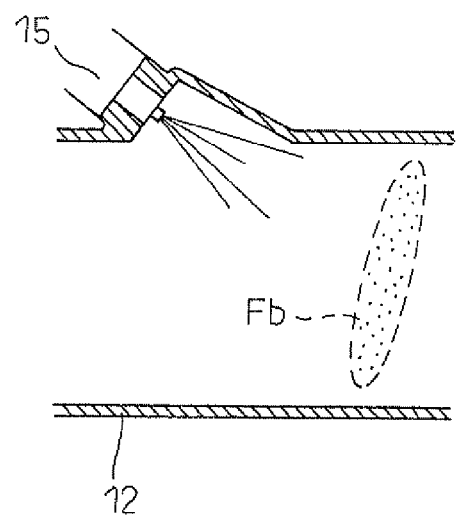

FIG. 18A and FIG. 18B show relationships between the injection pressure WP and the injection time WT when the injection amount of hydrocarbons is the same. As will be understood from FIG. 18A and FIG. 18B, if the injection pressure WP becomes low, the injection time WT becomes long, while if the injection pressure WP becomes high, the injection time WT becomes short. On the other hand, FIG. 19A shows the atomized fuel Fa of hydrocarbons formed by a single injection when the injection pressure WP is low such as shown in FIG. 18A, while FIG. 19B shows the atomized fuel Fb of hydrocarbons formed by a single injection when the injection pressure WP is high such as shown in FIG. 18B. Note that, FIG. 19A and FIG. 19B show cases where the flow rate of the exhaust gas is the same. From FIGS. 19A and 19B, it will be understood that if the injection pressure WP becomes high, the volume occupied by the atomized fuel becomes small and the concentration of hydrocarbons in the atomized fuel becomes high.

Now, when the oxidizing strength of the exhaust purification catalyst 13 is strong, if forming atomized fuel Fa with a low hydrocarbon concentration such as shown in FIG. 19A, the hydrocarbons will end up being completely oxidized. As a result, the reducing intermediate will no longer be able to be produced. As opposed to this, when the oxidizing strength of the exhaust purification catalyst 13 is strong, if forming atomized fuel Fb with a high hydrocarbon concentration as shown in FIG. 19B, the hydrocarbons will be partially oxidized without being completely oxidized, that is, the hydrocarbons will be reformed and consequently the reducing intermediate will be produced. Therefore, when the oxidizing strength of the exhaust purification catalyst 13 is strong, it is preferable to form atomized fuel Fb with a high hydrocarbon concentration, that is, to raise the injection pressure WP.

On the other hand, when the oxidizing strength of the exhaust purification catalyst 13 is weak, if forming atomized fuel Fa with a low hydrocarbon concentration such as shown in FIG. 19A, the hydrocarbons will be partially oxidized without being completely oxidized, that is, the hydrocarbons will be reformed so as to form the reducing intermediate. As opposed to this, when the oxidizing strength of the exhaust purification catalyst 13 is weak, if forming atomized fuel Fb with a high hydrocarbon concentration such as shown in FIG. 19B, a large amount of hydrocarbons will simply be exhausted from the exhaust purification catalyst 13 without being oxidized and therefore the amount of hydrocarbons which is wastefully consumed will increase. Therefore, when the oxidizing strength of the exhaust purification catalyst 13 is weak, it is preferable to form atomized fuel Fa with a low hydrocarbon concentration, that is, to lower the injection pressure WP.

Therefore, in the present invention, when the new $NO_x$ purification method is being worked, that is, when, at the time of engine operation, the predetermined amount of hydrocarbons is injected from the hydrocarbon feed valve 15 by the predetermined feed period, the injection pressure WP of hydrocarbons from the hydrocarbon feed valve 15 is increased in accordance with the increase in the oxidizing strength of the exhaust purification catalyst 13.

In this regard, in this case, the oxidizing strength of the exhaust purification catalyst 13 increases the higher the temperature of the exhaust purification catalyst 13. Therefore, in this embodiment according to the present invention, the injection pressure of the hydrocarbons is increased in accordance with an increase in the temperature of the exhaust purification catalyst 13. Specifically speaking, in this embodiment according to the present invention, the relationship between the correction coefficient KP1 for the reference injection pressure WP0 of hydrocarbons and the catalyst temperature TC of the exhaust purification catalyst 13 shown in FIG. 20 and the relationship between the correction coefficient KT1 for the reference injection time WT0 and the catalyst temperature TC of the exhaust purification catalyst 13 shown in FIG. 17 are stored in advance. The correction coefficients KP1 and KT1 which are found from these relationships are used to calculate the actual injection pressure WP and the actual injection time WT.

Figure 20:
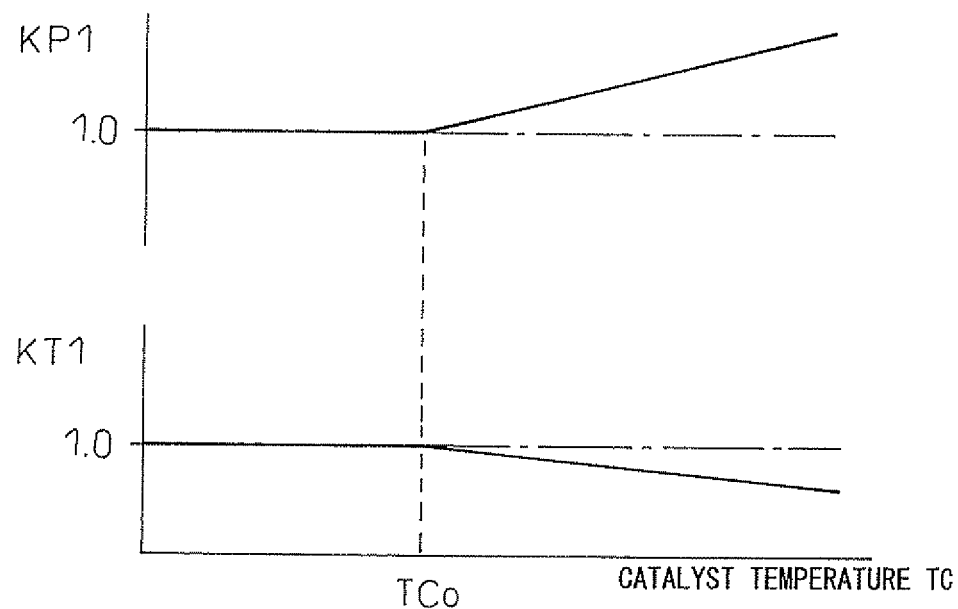
FIG. 20 is a view showing a relationship between values of correction coefficients KP1 and KT1 and a catalyst temperature TC.

That is, in this embodiment according to the present invention, from FIG. 20, it will be understood that when the catalyst temperature TC is lower than a predetermined reference temperature $TC_0$, the actual injection pressure WP is made the reference injection pressure WP0 and the actual injection time WT is made the reference injection time WT0 shown in FIG. 17, while when the catalyst temperature TC exceeds the predetermined reference temperature $TC_0$, the actual injection pressure WP is made to increase from the reference injection pressure WP0 and the actual injection time WT is made shorter than the reference injection time WT0.

Further, the oxidizing strength of the exhaust purification catalyst 13 becomes stronger if the sulfur poisoning of the exhaust purification catalyst 13 increases. That is, exhaust gas includes $SO_x$. If this $SO_x$ flows into the exhaust purification catalyst 13, sometimes it will be stored in the basic layer 53 in the form of sulfates. This storage action of $SO_x$ first occurs at the upstream side end of the exhaust purification catalyst 13, therefore, along with the elapse of time, the amount of sulfates which are stored in the basic layer 53 gradually increases at the upstream side end of the exhaust purification catalyst 13.

If the stored amount of sulfates increases, the basicity of the basic layer 53 will weaken and, as a result, the oxidizing ability of the precious metal 51 at the upstream side end of the exhaust purification catalyst 13 will increase. When the oxidizing ability of the precious metal 51 at the upstream side end of the exhaust purification catalyst 13 increases in this way, to cause the production of the reducing intermediate, it is preferable to form atomized fuel Fb with a high hydrocarbon concentration such as shown in FIG. 19B, that is, to raise the injection pressure WP.

Figure 21:
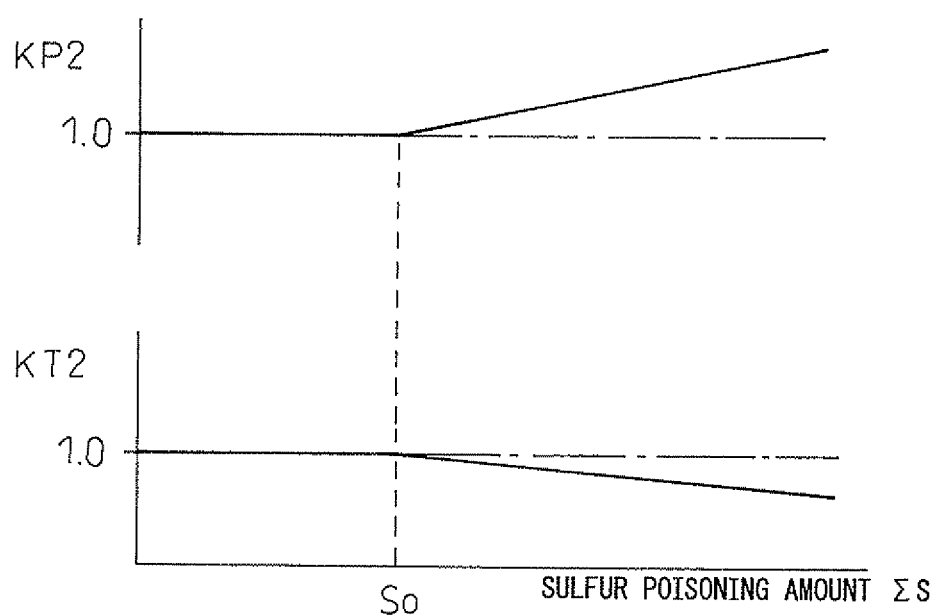
FIG. 21 is a view showing a relationship between values of correction coefficients KP2 and KT2 and sulfur poisoning ΣS etc.

Therefore, in this embodiment according to the present invention, the injection pressure WP of hydrocarbons is increased in accordance with an increase in sulfur poisoning at the upstream side end of the exhaust purification catalyst 13. Specifically speaking, in this embodiment according to the present invention, the relationship between the correction coefficient KP2 for the reference injection pressure WPO of hydrocarbons and the sulfur poisoning $\Sigma S$ of the exhaust purification catalyst 13 such as shown in FIG. 21 and the relationship between the correction coefficient KT2 for the reference injection time WT0 and the sulfur poisoning $\Sigma S$ of the exhaust purification catalyst 13 shown in FIG. 17 are stored in advance. The correction coefficients KP2 and KT2 which are found from these relationships are used to calculate the actual injection pressure WP and the actual injection time WT respectively.

That is, in this embodiment, from FIG. 21, it will be understood that when the sulfur poisoning $\Sigma S$ is lower than a predetermined reference poisoning $S_0$, the actual injection pressure WP is made the reference injection pressure WP0 and the actual injection time WT is made the reference injection time WT0 shown in FIG. 17, while when the sulfur poisoning $\Sigma S$ exceeds the predetermined reference poisoning $S_0$, the actual injection pressure WP is made to increase from the reference injection pressure WP0 and the actual injection time WT is made shorter than the reference injection time WT0.

On the other hand, if the flow rate of the exhaust gas becomes faster, that is, if the intake air amount increases, the concentration of hydrocarbons in the atomized fuel of the hydrocarbons will become thinner. At this time, it is preferable to increase the concentration of hydrocarbons in the atomized fuel of the hydrocarbons so as to produce the reducing intermediate well, that is, to raise the injection pressure WP. Therefore, in this embodiment according to the present invention, the injection pressure WP of hydrocarbons is increased in accordance with an increase in the intake air amount, that is, in accordance with an increase in the flow rate of the exhaust gas which flows through the inside of the engine exhaust passage.

Figure 22:
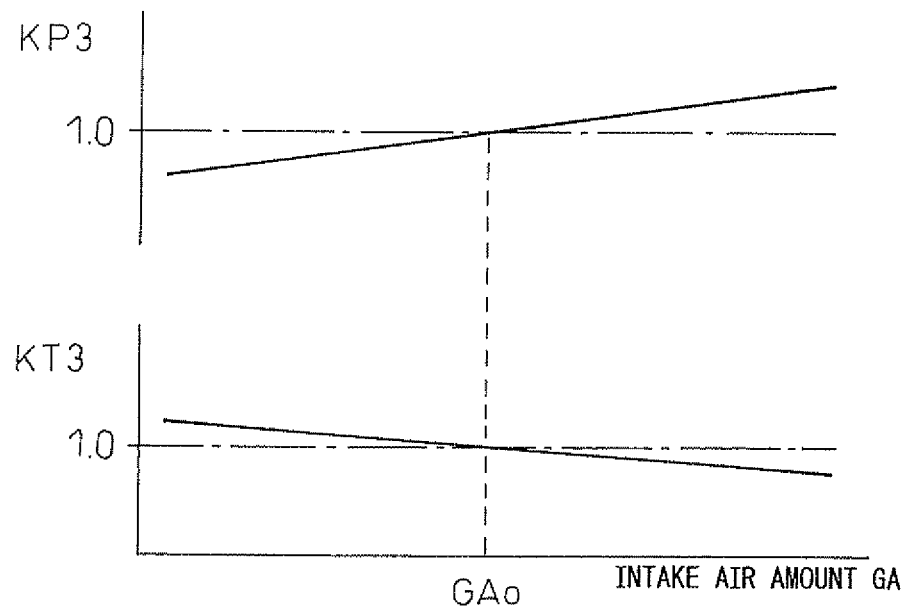
FIG. 22 is a view showing a relationship between values of correction coefficients KP3 and KT3 and an intake air amount GA.

Specifically speaking, in this embodiment according to the present invention, the relationship between the correction coefficient KP3 for the reference injection pressure WP0 of the hydrocarbons and the intake air amount GA such as shown in FIG. 22 and the relationship between the correction coefficient KT3 for the reference injection time WT0 and the intake air amount GA shown in FIG. 17 are stored in advance. The correction coefficients KP3 and KT3 which are found from these relationships are used to calculate the actual injection pressure WP and the actual injection time WT respectively.

Note that, the reference injection time WT0 shown in FIG. 17 shows a value when the intake air amount GA is the reference intake air amount $GA_0$ shown in FIG. 22, therefore, when the intake air amount GA is the reference intake air amount $GA_0$, the values of the correction coefficients KP3 and KT3 become 1.0. Further, the value of the correction coefficient KP3 becomes larger as the intake air amount GA increases, while the value of the correction coefficient KT3 becomes smaller as the intake air amount GA increases.

Further, for example, at the time of regeneration of the particulate filter 14, the particulate filter 14 has to be raised in temperature. At this time, the injection amount of hydrocarbons from the hydrocarbon feed valve 15 is increased. In this regard, when the injection amount of hydrocarbons is increased in this way, if maintaining the injection pressure WP of hydrocarbons at the reference injection pressure WP0, the hydrogen concentration in the atomized fuel of hydrocarbons becomes extremely high. As a result, it becomes difficult to cause all of the hydrocarbons which are injected to be partially oxidized. Therefore, the situation is caused where part of the hydrocarbons pass straight through the exhaust purification catalyst 13.

Figure 23:
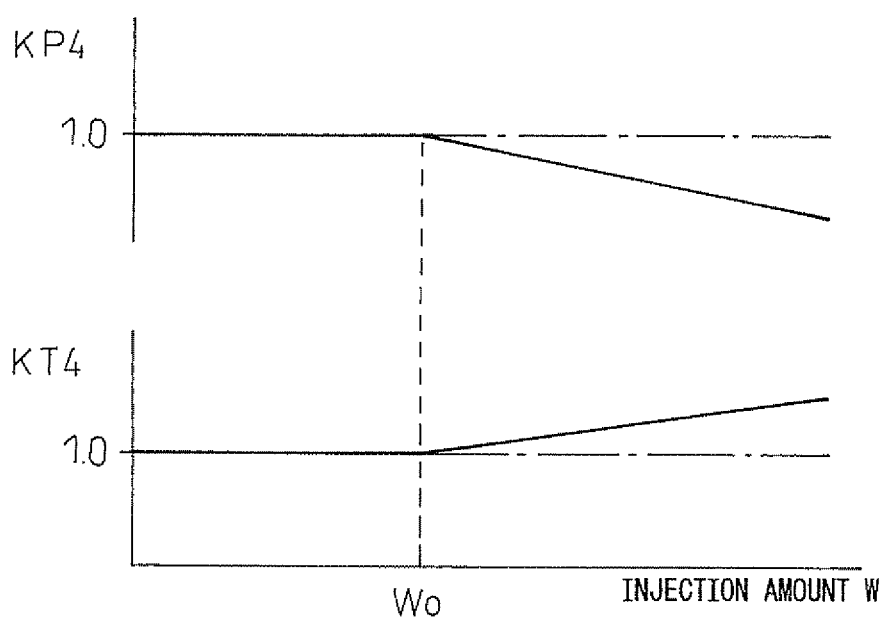
FIG. 23 is a view showing a relationship between values of correction coefficients KP4 and KT4 and an injection amount W.

Therefore, in this embodiment according to the present invention, the injection pressure WP of hydrocarbons is increased in accordance with an increase in the injection amount of hydrocarbons from the hydrocarbon feed valve 15. Specifically speaking, in this embodiment according to the present invention, the relationship between the correction coefficient KP4 for the reference injection pressure WP0 of the hydrocarbons and the injection amount of hydrocarbons W such as shown in FIG. 23 and the relationship between the correction coefficient KT4 for the reference injection time WT0 and the injection amount of hydrocarbons W shown in FIG. 17 are stored in advance. The correction coefficients KP4 and KT4 which are found from these relationships are used to calculate the actual injection pressure WP and the actual injection time WT respectively.

That is, in this embodiment according to the present invention, from FIG. 23, it will be understood that when the injection amount W is lower than a predetermined reference injection amount $W_0$, the actual injection pressure WP is made the reference injection pressure WP0 and the actual injection time WT is made the reference injection time WT0 shown in FIG. 17, while when the injection amount W exceeds the predetermined reference injection amount $W_0$, the actual injection pressure WP is made to fall from the reference injection pressure WP0 and the actual injection time WT is made longer than the reference injection time WT0.

Figure 24:
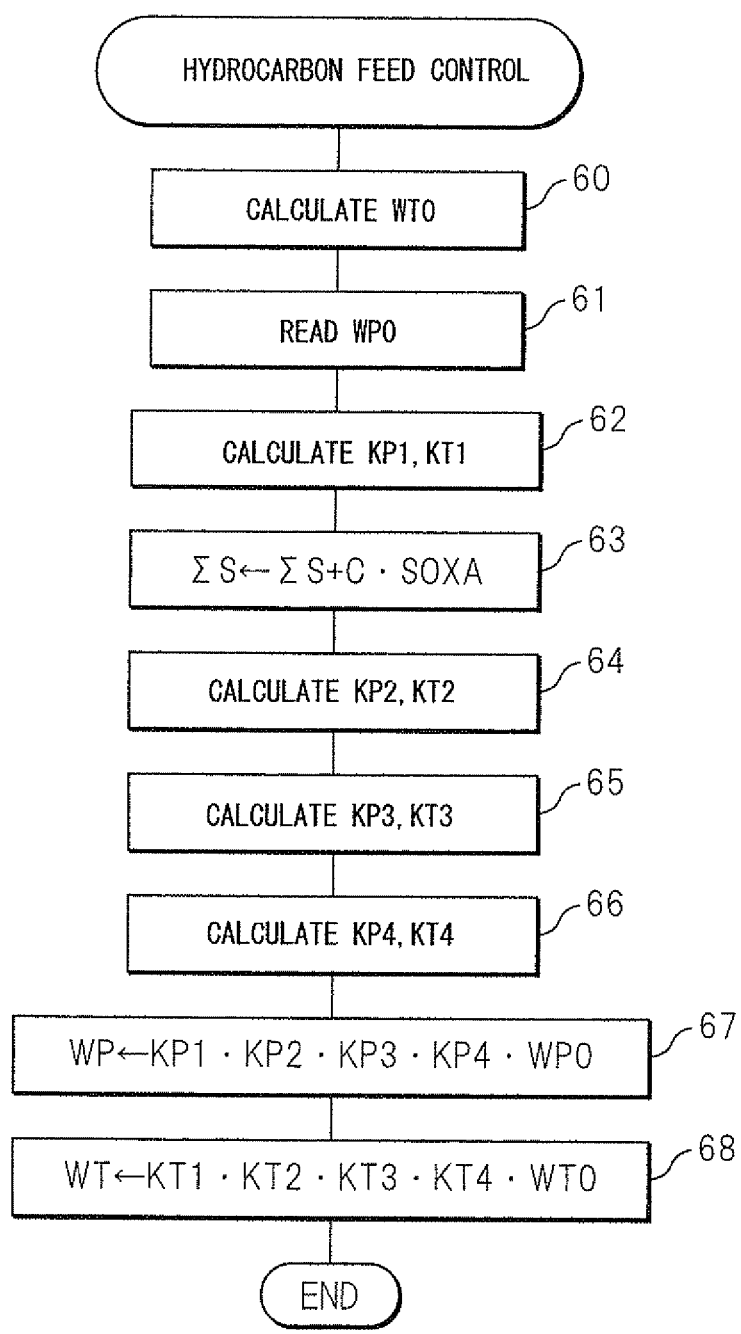
FIG. 24 is a flow chart for control for feed of hydrocarbons.

FIG. 24 show a control routine of the hydrocarbon feed amount. This routine is executed by interruption every predetermined time.

Referring to FIG. 24, first, at step 60, the reference injection time WT0 in accordance with the operating state of the engine is calculated from the map shown in FIG. 17. Next, at step 61, the reference injection pressure WP0 is read. Next, at step 62, the catalyst temperature TC of the exhaust purification catalyst 13 which is detected by the temperature sensor 26 is used to calculate the values of the correction coefficients KP1 and KT1 from the relationship shown in FIG. 20. Next, at step 63, the sulfur poisoning ΣS is calculated.

That is, the amount of the $SO_x$ which is contained in the exhaust gas is determined accordingly when the operating state of the engine is determined. The $SO_x$ amount SOXA which is exhausted from the engine per unit time is stored as a function of the engine operating state in advance in the ROM 32. The $SO_x$ amount which is stored in the exhaust purification catalyst 13 is considered to be proportional to the $SO_x$ amount SOXA which is exhausted from the engine. Therefore, at step 63, ΣS is added to the product of the $SO_x$ amount SOXA and a proportional constant C so as to calculate the sulfur poisoning ΣS. At step 64, this calculated sulfur poisoning ΣS is used to calculate the values of the correction coefficients KP2 and KT2 from the relationship shown in FIG. 21.

Next, at step 65, the intake air amount GA which is detected by the intake air amount detector 8 is used to calculate the values of the correction coefficients KP3 and KT3 from the relationship shown in FIG. 22. Next, at step 65, the injection amount W is used as the basis to calculate the values of the correction coefficients KP4 and KT4 from the relationship shown in FIG. 23. Next, at step 67, the reference injection pressure WP0 is multiplied with the values of all corresponding correction coefficients KP1, KP2, KP3, and KP4 to calculate the final injection pressure WP, then the actual injection pressure is made this final injection pressure WP. Next, at step 68, the reference injection time WT0 is multiplied with the values of all corresponding correction coefficients KT1, KT2, KT3, and KT4 to calculate the final injection time WT, then the actual injection time is made this final injection time WT.

Note that, as another embodiment, in the engine exhaust passage upstream of the exhaust purification catalyst 13, an oxidation catalyst for modifying the hydrocarbons can be arranged.

REFERENCE SIGNS LIST

4 . . . intake manifold
5 . . . exhaust manifold
7 . . . exhaust turbocharger
12 . . . exhaust pipe
13 . . . exhaust purification catalyst
14 . . . particulate filter
15 . . . hydrocarbon feed valve

The invention claimed is:

1. An exhaust purification system of an internal combustion engine, the exhaust purification system comprising:
   an engine exhaust passage;
   a hydrocarbon feed valve for feeding hydrocarbons, the hydrocarbon feed valve being arranged inside of the engine exhaust passage;
   an exhaust purification catalyst for reacting $NO_x$ contained in exhaust gas and reformed hydrocarbons, the exhaust purification catalyst being arranged inside of the engine exhaust passage and downstream of the hydrocarbon feed valve; wherein
      a precious metal catalyst is carried on an exhaust gas flow surface of the exhaust purification catalyst;
      a basic exhaust gas flow surface part is formed around the precious metal catalyst; and
   an electronic control unit having control logic configured to cause the electronic control unit to control an injection pressure and an injection time of the hydrocarbons fed from the hydrocarbon feed valve into the exhaust purification catalyst in accordance with an oxidizing strength of the exhaust purification catalyst, such that the fed hydrocarbons vibrate at a predetermined range of amplitude for a predetermined period of time, and wherein the control logic is configured to cause the electronic control unit to control the injection pressure and the injection time of the hydrocarbons fed from the hydrocarbon feed valve into the exhaust purification catalyst such that when the injection pressure increases, the injection time decreases, and wherein the control logic is configured to cause the electronic control unit to control the injection time of the fed hydrocarbons longer than the predetermined period of time,
   wherein when the fed hydrocarbons vibrate at the predetermined range of amplitude for the predetermined period of time, the precious metal catalyst causes the $NO_x$ contained in the exhaust gas and the reformed hydrocarbons to react to produce a reducing intermediate that contains nitrogen and hydrocarbons, the produced reducing intermediate is held on the basic exhaust gas flow surface part, a reducing action of the reducing intermediate that is held on the basic exhaust gas flow surface part chemically reduces the $NO_x$, the exhaust purification catalyst has a property of chemically reducing the $NO_x$ that is contained in the exhaust gas without storing, or storing a fine amount of nitrates in the basic exhaust gas flow surface part, and the predetermined period of time is a period of time required for continuing to produce the reducing intermediate, and
   wherein when the electronic control unit controls the injection time of the fed hydrocarbons longer than the predetermined period of time, the exhaust purification catalyst has a property being increased in storage amount of $NO_x$ that is contained in exhaust gas.

2. The exhaust purification system of an internal combustion engine as claimed in claim 1, wherein the injection pressure of the hydrocarbons is increased in accordance with an increase in temperature of the exhaust purification catalyst.

3. The exhaust purification system of an internal combustion engine as claimed in claim 1, wherein the injection pressure of the hydrocarbons is increased in accordance with an increase in sulfur poisoning at an upstream side end of the exhaust purification catalyst.

4. The exhaust purification system of an internal combustion engine as claimed in claim 2, wherein the injection pressure of the hydrocarbons is increased in accordance with an increase in a flow rate of exhaust gas which flows through the inside of the engine exhaust passage.

5. The exhaust purification system of an internal combustion engine as claimed in claim 1, wherein the injection pressure of the hydrocarbons is increased in accordance with an increase in the injection amount of hydrocarbons from the hydrocarbon feed valve.

6. The exhaust purification system of an internal combustion engine as claimed in claim 1, wherein the precious metal catalyst is comprised of platinum Pt and at least one of rhodium Rh and palladium Pd.

7. The exhaust purification system of an internal combustion engine as claimed in claim 1, wherein, on the exhaust gas flow surface of the exhaust purification catalyst, a basic layer is formed which includes an alkali metal, alkali earth metal, rare earth, or metal which can donate electrons to $NO_x$, and a surface of the basic layer forms the basic exhaust gas flow surface part.

8. The exhaust purification system of an internal combustion engine as claimed in claim 3, wherein the injection pressure of the hydrocarbons is increased in accordance with an increase in a flow rate of exhaust gas which flows through the inside of the engine exhaust passage.

9. The exhaust purification system of an internal combustion engine as claimed in claim 1, wherein the injection pressure of the hydrocarbons from the hydrocarbon feed valve is increased in accordance with an increase in the oxidizing strength of the exhaust purification catalyst.

10. The exhaust purification system of an internal combustion engine as claimed in claim 1, wherein the injection pressure of the hydrocarbons from the hydrocarbon feed valve is decreased in accordance with a decrease in the oxidizing strength of the exhaust purification catalyst.

11. The exhaust purification system of an internal combustion engine as claimed in claim 1, wherein when the injection pressure increases and the injection time decreases, an amount of hydrocarbons injected in a single injection before the pressure increase is the same as an amount of hydrocarbons injected in a single injection after the pressure increase, when a flow rate of the exhaust gas is the same.

* * * * *